US010187520B2

(12) United States Patent
Seo et al.

(10) Patent No.: US 10,187,520 B2
(45) Date of Patent: Jan. 22, 2019

(54) TERMINAL DEVICE AND CONTENT DISPLAYING METHOD THEREOF, SERVER AND CONTROLLING METHOD THEREOF

(71) Applicant: SAMSUNG ELECTRONICS CO., LTD., Suwon-si (KR)

(72) Inventors: Ju-hee Seo, Hwaseong-si (KR);
Han-tak Kwak, Suwon-si (KR);
Hyun-woo Nam, Suwon-si (KR);
Sung-bum Park, Seongnam-si (KR);
Se-Hoon Kim, Suwon-si (KR);
Woo-sung Shim, Suwon-si (KR);
Seo-young Lee, Suwon-si (KR);
Yang-wook Kim, Hwaseong-si (KR);
Hae-in Chun, Suwon-si (KR); Jae-ho Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 144 days.

(21) Appl. No.: 14/678,759

(22) Filed: Apr. 3, 2015

(65) Prior Publication Data
US 2015/0215450 A1 Jul. 30, 2015

Related U.S. Application Data

(63) Continuation-in-part of application No. 14/260,822, filed on Apr. 24, 2014.
(Continued)

(30) Foreign Application Priority Data

Apr. 24, 2013 (KR) .................. 10-2013-0045657
Nov. 4, 2013 (KR) .................. 10-2013-0132855

(51) Int. Cl.
*H04L 29/08* (2006.01)
*H04M 3/42* (2006.01)
(Continued)

(52) U.S. Cl.
CPC ........ *H04M 3/42042* (2013.01); *H04L 67/02* (2013.01); *H04L 67/10* (2013.01);
(Continued)

(58) Field of Classification Search
CPC .............. H04L 67/02; G06F 17/30867; H04M 3/42042
(Continued)

(56) References Cited

U.S. PATENT DOCUMENTS 7,190,773 B1 * 3/2007 D'Silva ............... H04M 7/0033
379/142.06
7,751,539 B2 * 7/2010 Watano ................. H04W 76/11
379/93.08
(Continued)

FOREIGN PATENT DOCUMENTS

CN 101067858 A 11/2007
CN 101753674 A 6/2010
(Continued)

OTHER PUBLICATIONS

"Thread is the Ultimate Caller ID for Android"—Mashable.com, Princeton University, Mar. 11, 2013 https://mashable.com/2013/03/11/thread-caller-id/.*
(Continued)

*Primary Examiner* — Randy A Scott
(74) *Attorney, Agent, or Firm* — Sughrue Mion, PLLC

(57) ABSTRACT

A terminal apparatus is disclosed. The terminal apparatus includes a display; a communicator configured to receive an incoming call; a storage configured to store contact object information including a connecting application corresponding to caller identification information; and a controller configured to receive the incoming call including the caller identification information received through the communicator, execute the connecting application corresponding to the
(Continued)

caller identification information, and display a search result related to the contact object information in a screen of the executed connecting application on the display. Accordingly, it is possible to determine a counterpart during connecting a call, and automatically execute the connecting application per contact information.

16 Claims, 39 Drawing Sheets

Related U.S. Application Data

(60) Provisional application No. 61/975,301, filed on Apr. 4, 2014.

(51) Int. Cl.
*H04M 1/725* (2006.01)
*H04M 1/57* (2006.01)

(52) U.S. Cl.
CPC .............. *H04L 67/18* (2013.01); *H04L 67/22* (2013.01); *H04L 67/26* (2013.01); *H04L 67/306* (2013.01); *H04M 1/57* (2013.01); *H04M 1/72522* (2013.01); *H04M 1/72597* (2013.01)

(58) Field of Classification Search
USPC ..... 709/203, 217, 219, 220, 231; 455/414.1, 455/466, 566, 566.1
See application file for complete search history.

(56) References Cited

U.S. PATENT DOCUMENTS

| | | | |
|---|---|---|---|
| 8,312,140 B2 | 11/2012 | Zuckerberg et al. | |
| 8,331,916 B2 | 12/2012 | Martin et al. | |
| 8,576,999 B2 | 11/2013 | Naruse | |
| 8,607,146 B2 | 12/2013 | Hickman | |
| 8,867,779 B2 | 10/2014 | Anbalagan et al. | |
| 2003/0154233 A1* | 8/2003 | Patterson | G06F 9/50 718/104 |
| 2004/0153545 A1* | 8/2004 | Pandya | H04L 29/06 709/226 |
| 2006/0129600 A1* | 6/2006 | Ode | G06F 9/4843 |
| 2008/0263451 A1* | 10/2008 | Portele | G06F 3/167 715/727 |
| 2009/0063372 A1 | 3/2009 | Lu et al. | |
| 2009/0077495 A1 | 3/2009 | Bhat et al. | |
| 2009/0124241 A1 | 5/2009 | Krishnaswamy et al. | |
| 2009/0235312 A1 | 9/2009 | Morad et al. | |
| 2009/0282358 A1 | 11/2009 | Park et al. | |
| 2010/0054601 A1 | 3/2010 | Anbalagan et al. | |
| 2010/0079370 A1 | 4/2010 | Kim et al. | |
| 2010/0208876 A1 | 8/2010 | Tsuei | |
| 2011/0078623 A1 | 3/2011 | Liu et al. | |
| 2011/0201320 A1* | 8/2011 | Wosk | H04M 1/274516 455/415 |
| 2011/0288913 A1 | 11/2011 | Waylonis et al. | |
| 2012/0052850 A1 | 3/2012 | Martin et al. | |
| 2012/0209839 A1 | 8/2012 | Andrews et al. | |
| 2012/0209907 A1 | 8/2012 | Andrews et al. | |
| 2012/0221563 A1 | 8/2012 | De et al. | |
| 2013/0019173 A1 | 1/2013 | Kotler et al. | |
| 2013/0035054 A1 | 2/2013 | Ashton | |
| 2013/0324093 A1 | 12/2013 | Santamaria et al. | |
| 2015/0016691 A1 | 1/2015 | Anbalagan et al. | |

FOREIGN PATENT DOCUMENTS

| | | |
|---|---|---|
| CN | 102132244 A | 7/2011 |
| CN | 102646109 A | 8/2012 |
| CN | 102693261 A | 9/2012 |
| JP | 2007328405 A | 12/2007 |
| JP | 4794363 B2 | 10/2011 |
| JP | 2011233955 A | 11/2011 |
| KR | 20070032229 A | 3/2007 |
| KR | 20090116932 A | 11/2009 |
| KR | 20100036739 A | 4/2010 |
| KR | 20100043613 A | 4/2010 |
| KR | 20100056532 A | 5/2010 |
| KR | 20100081725 A | 7/2010 |
| KR | 20100115960 A | 10/2010 |
| KR | 20120023317 A | 3/2012 |
| KR | 20120091033 A | 8/2012 |
| KR | 20120099814 A | 9/2012 |
| KR | 101270434 B1 | 6/2013 |
| KR | 101379405 B1 | 3/2014 |
| WO | 20100079876 A1 | 7/2010 |
| WO | 2012/112272 A2 | 8/2012 |

OTHER PUBLICATIONS

Communication dated Oct. 29, 2014 issued by the European Patent Office in counterpart European Application No. 14165843.5.
European Patent Office, "Communication with Extended European Search Report," issued in connection with European Patent Application No. 14165843.5, dated Mar. 18, 2015.
"Current Caller ID", Internet Article, http://current-caller-id.en.uptodown.com/android.
Communication dated Mar. 5, 2018, issued by the State Intellectual Property Office of P.R. China in counterpart Chinese application No. 201410189655.8.
Communication dated Nov. 6, 2018, issued by the State Intellectual Property Office of the People's Republic of China in counterpart Chinese Patent Application No. 201410189655.8.

* cited by examiner

43a

43b

TERMINAL DEVICE AND CONTENT DISPLAYING METHOD THEREOF, SERVER AND CONTROLLING METHOD THEREOF

CROSS-REFERENCE TO RELATED APPLICATIONS

This is a continuation-in-part of prior U.S. application Ser. No. 14/260,822, filed on Apr. 24, 2014, now pending, of which benefit is claimed under 35 U.S.C. § 120. This application also is related to, and claims priority from U.S. Provisional Patent Application No. 61/975,301, filed on Apr. 4, 2014, in the United States Patent and Trademark Office, and Korean Patent Application Nos. 10-2013-0045657, filed on Apr. 24, 2013, and 10-2013-0132855, filed on Nov. 4, 2013, in the Korean Intellectual Property Office, the disclosures of which are incorporated herein by reference in their entirety.

BACKGROUND

Field

Aspects of one or more exemplary embodiments relate to a terminal apparatus, a method for displaying content, a server, and a method for controlling the server, more particularly to a terminal apparatus providing content based on user information, a method for displaying content, a server, and a method for controlling the server.

Description of Related Art

Recent advancement in the communication technology and technology of an electronic apparatus has enabled development of various terminal apparatuses and provision of network services. A user uploads and downloads content by using a fixed terminal apparatus such as a PC or a portable terminal apparatus such as a smartphone. Or, a user views content of another person via a terminal apparatus.

For example, in order for a user to upload and download content to a SNS (Social Network Service) site via a portable terminal apparatus, the user needs to access an exclusive application. In addition, a great many users upload content, and thus there exists a large amount of content. Accordingly, a user, to access a plurality of SNS sites, needs to use a plurality of exclusive applications. Moreover, a user can miss content the user is interested in, or content related to the user, due to the large amount of content.

Therefore, there has been a necessity to develop technologies that may enable a user to easily access a site relevant to a user or content relevant to a user.

SUMMARY

An aspect of one or more exemplary embodiments is designed in accordance with the above-described necessity and is purposed to provide a terminal apparatus which displays a content based on user information, a method for displaying a content, a server, and a method for controlling a server. However, one or more exemplary embodiments may not address all the above-described problems or may address additional problems not described.

According to an exemplary embodiment, there is provided a method for displaying content of a terminal apparatus, the method including storing contact object information that includes a connecting application corresponding to caller identification information; receiving an incoming call that includes the caller identification information; executing the connecting application corresponding to the caller identification information; and displaying a search result related to the contact object information on a screen of the connecting application.

The caller identification information may include a telephone number, and the displaying the search result may comprise displaying the caller identification information together with the search result.

The displaying the search result may comprise displaying the search result corresponding to the contact object information such that it is differentiated from other items in the connecting application.

The contact object information may comprise at least one from among the connecting application corresponding to a contact object and a shortcut icon corresponding to the connecting application.

The method may further include in response to there being a plurality of connecting applications corresponding to the caller identification information, setting some of the plurality of connecting applications as connecting applications with priority and some of the plurality of connection applications as connecting applications without priority.

In response to there being a plurality of connecting applications corresponding to the caller identification information, the receiving the incoming call may comprise displaying a shortcut icon corresponding to a connecting application with priority.

The method may further include in response to the incoming call being received, displaying an incoming call screen that includes the caller identification information corresponding to the incoming call.

At least one from among a visual feedback, audio feedback, and tactile feedback may be provided via the connecting application screen in response to a display of the search result.

The method may further include in response to a preset event occurring, displaying a curation content based on contact object information related to the preset event.

According to another exemplary embodiment, there is provided a terminal apparatus a display; a communicator configured to receive an incoming call; a storage configured to store contact object information including a connecting application corresponding to caller identification information; and a controller configured to receive the incoming call including the caller identification information received through the communicator, execute the connecting application corresponding to the caller identification information, and display a search result related to the contact object information in a screen of the executed connecting application on the display.

The display may include a touch screen, and the controller controls to store the contact object information being input through the touch screen in the storage.

The controller may display the caller identification information together with the search result.

The controller may display the search result corresponding to the contact object information such that it is differentiated from other items in the connecting application.

The contact object information may include at least one from among the connecting application corresponding to a contact object and a shortcut icon corresponding to the connecting application.

The controller, in response to there being a plurality of connecting applications corresponding to the caller identification information, may display a connecting application with priority on the display.

The controller, in response to there being a plurality of connecting applications corresponding to the caller identification information, may display a shortcut icon corresponding to a connecting application having priority on the display.

The controller, in response to the incoming call being received, may display an incoming call screen that includes the caller identification information corresponding to the incoming call.

A size area of the connecting application screen where the search result is displayed may be smaller than a size area of the incoming call screen.

The controller may change the incoming call screen to the connecting application screen where the search result is displayed.

The controller, in response to a preset event occurring, may display a curation content based on contact object information related to the preset event.

BRIEF DESCRIPTION OF THE DRAWINGS

The above and/or other aspects of one or more exemplary embodiments will be described with reference to the accompanying drawings, in which.

DETAILED DESCRIPTION

Figure 1:
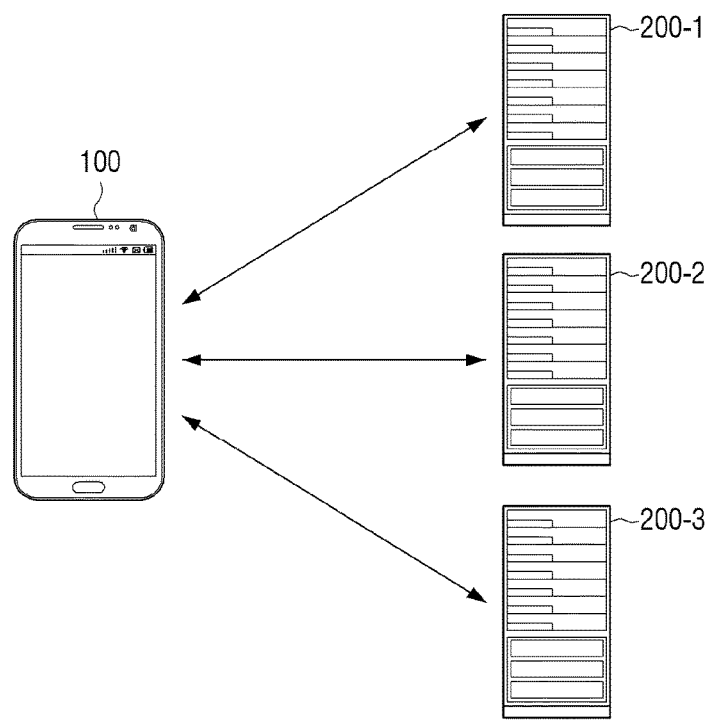
FIG. 1 is a view illustrating a curated content providing system according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Furthermore, terms that include ordinal numbers such as "a first" and "a second" may be used to explain various components, but the components are not limited by such terms. Such terms are used only for the purpose of differentiating one component from other components. For example, a first component may be referred to as a second component without going beyond the scope of the rights of the present disclosure, and in a similar manner, a second component may be referred to as a first component. "and/or" includes a combination of a plurality of related items or one of the plurality of related items.

Furthermore, an application refers to software executed on an OS (Operating System) or a mobile OS and used by a user. For example, an application may include a word processor, spread sheet, contacts, calendar, memo, alarm, SNS (Social Network System), chatting, Map, music player or video player. An application according to an embodiment of the present disclosure may refer to software being executed on a mobile apparatus or on an external apparatus (for example, server etc.) connected to the mobile apparatus wirelessly or wiredly in response to a caller ID. Furthermore, an application according to an embodiment of the present disclosure may refer to software that may be connected (for example, registered) in response to a caller ID.

A content may be displayed on an connecting application being executed in response to a caller ID. For example, the content may include a schedule being displayed on a calendar application that is a type of connecting application, a memo being displayed on a memo application, work sheet being displayed on a spread sheet application, or a web page being displayed on an internet browser. The content may include audio, video, text, image or a web page being displayed or executed on a connecting application being executed in response to a caller ID. The content may include audio, video, text, image or web page being executed in response to a caller ID. Furthermore, the content may include one or a plurality of contents.

A widget refers to a mini application that is a type of GUI (Graphic User Interface) that smoothly supports an interaction between a user and application or OS. For example, there are weather widgets, calculator widgets, and clock widgets etc.

The terms used in the present application are for explaining exemplary embodiments of the present disclosure, not for limiting them. A singular expression includes a plurality of them unless expressed otherwise. In the present application, "including/include" or "having/have" are used to indicate that there exists a feature, number, step, operation, configurative element, component or a combination thereof, and not to exclude a possibility of existence of one or more features, numbers, steps, operations, configurative elements, components, or combinations thereof. Like drawing reference numerals are used for the like elements, even in different drawings.

FIG. 1 is a view illustrating a curated content providing system according to an exemplary embodiment.

Referring to FIG. 1, a system for providing a curated content includes a terminal apparatus 100 and a plurality of servers 200-1, 200-2, and 200-3.

As a non-limiting example, the terminal apparatus 100 may be a mobile phone including a communication function, a smartphone, a tablet, a PDA, a TV, or the like. The terminal apparatus 100 may include a wireless LAN module (not illustrated) and perform communication with the plurality of servers 200-1, 200-2, and 200-3. The wireless LAN module (not illustrated) may be connected to Internet, in accordance with control of a controller, at a place where a wireless AP (Access Point) (not illustrated) is installed. The wireless LAN module supports wireless LAN specification of IEEE (IEEE802.11x).

As to server 200, there may be a plurality of existing servers. The plurality of servers 200-1, 200-2, and 200-3 may transmit various contents to the terminal apparatus 100. A plurality of servers 200-1, 200-2, and 200-3 may be an information providing server and an SNS (Social Network Service) server. The information providing server may transmit an information content such as news and weather to the terminal apparatus 100. The SNS server may provide an appropriate content by storing a content uploaded by the terminal apparatus 100 and determining information of a user accessing the server.

As an exemplary embodiment, user information means authentication information such as log-in to access a service, and based on such information, information related to a user provided by the service may be obtained. As to the user information, not only information uploaded by a user but also information of another account which is in connection with a user may be used. Herein, the user information indicates information including procedure such as log-in, which may be requested for only once at the time of initial connection.

The terminal apparatus 100 extracts a curated content from a content related to user information received from the server 200. The curated content means a specific content related to user information in which a user is highly interested. A level of interest of a user may be determined by a certain standard. For example, the certain standard may be set as user-preference of other users on the content, content uploading date, whether or not an image of the user of the terminal apparatus 100 is included in the content related to the user information, a category selected by a user of the terminal apparatus 100, relevancy with a content recently uploaded by a user of the terminal apparatus 100, or the like. As non-limiting examples, user-preference of other users may be determined by the number of clicks of the content, the number of views, the number of downloads, the number of recommendations, or the like. That is, user-preference on a content indicates preference of other users, and this preference includes responses in the SNS to the content. In addition, content uploading date includes the date in which a content was registered in the SNS. A certain standard to extract a curated content may be set as a plurality of standards, and in this case, the standard may be determined based on assigned priority.

For example, if the number of recommendations of other users and the uploading date are the standards, priority can be set based on the number of recommendations of other users. In this case, contents are listed in an order of greater recommendations by other users, but for the content having the same number of recommendations, they may be listed in an order of uploading date, and a curated content may be determined. As another example, the terminal apparatus 100 may assign the number of recommendations of other users and uploading date with a certain value, and add up the assigned values of each content. Then, the contents may be listed in an order of greater assigned values, and a curated content may be determined As to a subject of extracting a curated content, not only a content uploaded to an account of a user, but also a content uploaded to an account of another user who has a connection with the user may be included.

A method of extracting a curated content from the terminal apparatus 100 is an exemplary embodiment. In some cases, based on user information transmitted from the server 200 to the terminal apparatus 100, a curated content may be extracted, and the extracted content may be transmitted to the terminal apparatus 100.

The terminal apparatus 100 may be connected to the plurality of servers 200-1, 200-2, and 200-3. In order to connect the terminal apparatus 100 to a server executing a certain function, an IP (Internet Protocol) address of a server should be input, or an exclusive program (for example, an application) should be executed. The terminal apparatus 100 may count the number of connections to a server, connection duration, or the like. The terminal apparatus 100, by using at least one of the number of connections to the server and connection duration, may determine a server which is frequently connected to. For example, it may be assumed that the terminal apparatus 100 access SNS server 200-1 20 times, SNS server 200-2 12 times, and SNS server 200-3 7 times. The terminal apparatus 100 may set a server connected to over 5 times as a frequently-connected server. In this case, SNS server 200-1, SNS server 200-2, and SNS server 200-3 are set to be frequently-connected servers. The terminal apparatus 100 may set SNS server 200-1, SNS server 200-2, and SNS server 200-3 as target servers to receive curated content from.

Or, the terminal apparatus 100 may set a server connected to over 10 times as a frequently-connected server. In this case, SNS server 200-1 and SNS server 200-2 may be set as frequently-connected servers, and the terminal apparatus 100 may set only SNS server 200-1 and SNS server 200-2 as target servers to receive curated content from.

The terminal apparatus 100 may receive a curated content from the server 200, or display a curated content by extracting a curated content within the terminal apparatus 100.

Hereinbelow, the configuration of the terminal apparatus 100 which displays a curated content and the server 200 which transmits a curated content will be explained.

Figure 2A:
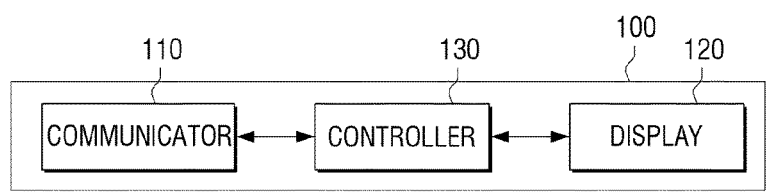
FIG. 2A is a block diagram illustrating a terminal apparatus according to an exemplary embodiment.

FIG. 2A is a block diagram of a terminal apparatus according to an exemplary embodiment. According to FIG. 2A, the terminal apparatus 100 includes a communicator 110, the display 120, and the controller 130.

The communicator 110, by performing communication with the server 200, transmits user information to the server 200, and receives a curated content from the server 200. The communicator 110, in response to a preset event, transmits user information by the control of the controller 130. The preset event may be at least one of a phone call receiving event which occurs at a phone application, an anniversary alarm event in accordance with a preset anniversary, and a nearing event according to a preset time. That is, the preset event does not indicate an event which generally occurs from an exclusive application that accesses the corresponding server 200, but an event which occurs at another application that is separate from the exclusive application.

User information may be user information of the terminal apparatus 100, information on a caller on the condition that a phone call receiving event, user information related to anniversary in case of an anniversary alarm event (for example, bride or bridegroom in case of a wedding anniversary, a person having a birthday in case of a birthday).

The display 120 displays a curated content. The curated content may be displayed by using a template suitable for an application where an event occurs. Herein, the display 130 may be implemented, as non-limiting examples, as at least one of a Liquid Crystal Display, Thin Film Transistor-liquid Crystal Display, Organic Light-emitting Diode, Flexible Display, and 3D Display.

The controller 130, in response to a preset event, controls the communicator 110 to transmit user information related to the preset event to the server 200 and receive a curated content. The terminal apparatus 100 receives a curated content from the server 200, but may receive more than the curated content. For example, when extracting the curated content from the terminal apparatus 100, the terminal apparatus 100 may receive content related to user information from the server 200. Curated content to be extracted may be included in the content related to user information.

As illustrated in FIG. 1, the controller 130 may determine an address of a server to be connected, and count a number of server connections and server connection duration. The controller 130 determines a server which is frequently connected to, by using at least one of the number of server connections and connection duration. The controller 130 may transmit user information to a server which is frequently connected.

The controller 130 displays a curated content. The controller 130 may reconstitute and display an image included in a curated content. Reconstitution of an image may include at least one image processing from among image retargeting, crop, image enhancement, and saturation compensation. For image processing, perception technology such as individual perception of a material, a person, animal; perception of correlation, face, facial expression, text, luminance, or the like, may be preceded. Moreover, a terminal apparatus may grasp meaning of a text and perform image processing. Further details of image reconstitution will be explained later.

Meanwhile, in response to the preset event, the controller 130 of the terminal apparatus aforementioned may transmit the user information related to the preset event to the server 200, and receive the curated content and display the received curated content. Meanwhile, in response to the preset event being receiving an incoming call, the controller 130 may detect caller identification information related to the incoming call, and execute various applications corresponding to the caller identification information detected.

Herein, in response to the incoming call being received, the controller 130 may transmit the caller identification information related to the incoming call to the server 200 and receive the curated content and display the curated content. Differently, the controller 130 may not necessarily transmit the caller identification information, but may execute an application corresponding to the caller identification information based on a relationship between the caller identification information already stored in the memory and the application. In such a case, in response to a preset event such as the incoming call being received, the user may execute the various applications related to the caller at the same time, and improve user convenience. This will be explained in further detail with reference to FIG. 2B.

Figure 2B:
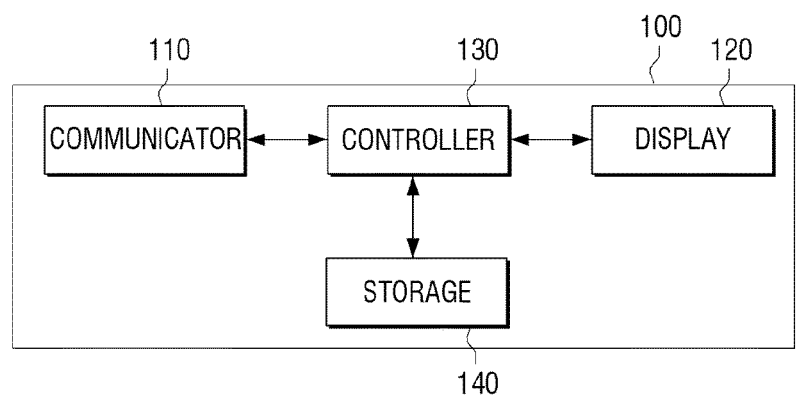
FIG. 2B is a block diagram illustrating a terminal apparatus according to another exemplary embodiment.

FIG. 2B is a block diagram illustrating a terminal apparatus according to another exemplary embodiment, Referring to FIG. 2B, the terminal apparatus 100 includes a communicator 110, display 120, controller 130 and storage 140. Herein, overall explanation on the communicator 110, display 120 and controller 130 was made with reference to FIG. 2A, and thus detailed explanation will be omitted.

The communicator 110 receives an incoming call, and the storage 140 stores contact object information that includes a connecting application corresponding to caller identification information. For example, the storage 140 stores the contact object information that includes information for operating a connecting application, which can be, for example, a memo or calendar corresponding to each of the caller identification information (ex. telephone numbers). A process of storing the contact object information that includes the connecting application corresponding to the caller identification information will be explained hereinafter.

The controller 130 receives the incoming call that includes the received caller identification information through the communicator 110, executes the connecting application corresponding to the caller identification information, and displays on a screen of the executed connection application a result of search related to the contact object information.

For example, in response to receiving a call from a user corresponding to one of a plurality of contact information stored in the storage 140, the controller 130 automatically executes a connecting application (ex. a calendar application) connected to the contact object information stored in the storage 140, and displays a telephone call screen and the calendar application related to the incoming call together.

Furthermore, the controller 130 may display the search result related to the contact object information of the caller on the calendar application executed, for example, a search result where a schedule or appointment related to the caller is displayed on the screen of the calendar application screen.

Meanwhile, the display 120 according to the exemplary embodiment of the present disclosure includes a touch screen, and may be embodied as a touch screen. Furthermore, the controller 130 may store the contact object information input through the touch screen according to a user touch manipulation in the storage 140.

As explained in FIG. 2B, the controller 130 may receive the incoming call that includes the received caller identification information, automatically execute the connecting application corresponding to the caller identification information, and display the search result related to the contact object information on the executed connecting application screen. Various exemplary embodiments thereof will be explained hereinafter.

Figure 3:
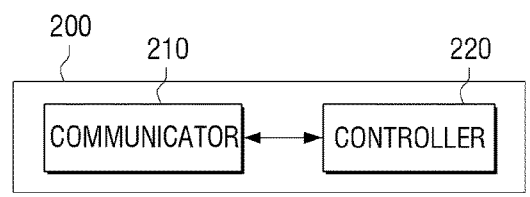
FIG. 3 is a block diagram illustrating of a server according to an exemplary embodiment.

FIG. 3 is a block diagram of a server according to an exemplary embodiment. Referring to FIG. 3, the server 200 includes the communicator 210 and the controller 220.

The communicator 210 receives user information from the terminal apparatus 100. User information may be user information of the terminal apparatus 100 which transmits information and user information related to an event which occurs at the terminal apparatus 100.

The controller 220 searches a content based on the received user information. As an exemplary embodiment, the controller 220 may search a content related to received user information.

As another exemplary embodiment, the controller 220 may extract a curated content based on a level of interest of a user from among the searched contents. The level of interest of a user may be determined based on a certain standard. The certain standard may be set as user-preference of other users on a content, content uploading date, whether an image of a user of the terminal apparatus 100 is included, a selection category of a user of the terminal apparatus 100, connectedness with a recently-uploaded content of a user of the terminal apparatus 100, etc. As non-limiting examples, user-preference of other users may be determined by the number of clicks of a content, the number of views, the number of downloads, the number of recommendations, or the like. The certain standard to extract a curated content may be set based on a plurality of numbers, and in this case, priority may be set for setting the standard.

For example, if the number of recommendations of other users and uploading date are the standards, priority can be set on the number of recommendations of other users. In this case, content may be listed in an order of greater recommendations by other users, but for the content having the same number of recommendations, they may be listed in an order of uploading date, and a curated content may be determined. As another example, the terminal apparatus 100 may assign the number of recommendations of other users and uploading date with a certain value, and add up the assigned values of each content. Then, the contents may be listed in an order of greater assigned values, and a curated content may be determined. Alternatively, the certain values of each could be multiplied together, weighted, or input into some other function to derive the assigned value of each content.

The server 200, according to an exemplary embodiment, transmits a curated content related to a user or an extracted curated content to the terminal apparatus 100.

Meanwhile, a method for connecting the terminal apparatus 100 and the server 200, and connection timing thereof are shown below.

For example, when phone call is received from a caller, a curated content related to information on a caller is received from the server 200, and in this case, the controller 130, as to a caller already registered in a telephone list or an application, may receive a curated content from a server in regular timing, even when a phone call is not received. Herein, the curated content is a content extracted based on user information, and when this information is transmitted to the terminal apparatus 100 from the server 200, may be displayed mainly as a link information or URL, etc.

Accordingly, the controller 130, upon receiving a phone call, may provide information on a caller, or link information or URL on social media related to the caller; the controller 130 may display link information or URL, etc. on a screen; or automatically display a new window corresponding to the link information or URL on a screen.

Meanwhile, a log-in may be required to access a link or URL, and in order to solve inconvenience that log-in should be implemented every time, the controller 130 enables log-in on the corresponding link information or URL to be implemented in advance, and be continued in the case where a call is received from a caller.

Meanwhile, the controller 130, in accordance with user setting, may set a media for sharing in response to a preset event, and designate link information or URL thereof. For example, in response to an event such as a birthday occurring, an application set based on registered date, time, a designating person, or a designated place, or link information and URL corresponding to the application may be automatically displayed.

In addition, the controller 130, even when there is no user setting, in response to a preset event, may display link information or URL of a content, based on the number of clicks of the content, the number of views, the number of downloads, the number of recommendations, content uploading date, media corresponding to the event, media corresponding to a person, media corresponding to a place, media corresponding to friends registered in social application, media corresponding to a certain keyword, etc.

Figure 4:
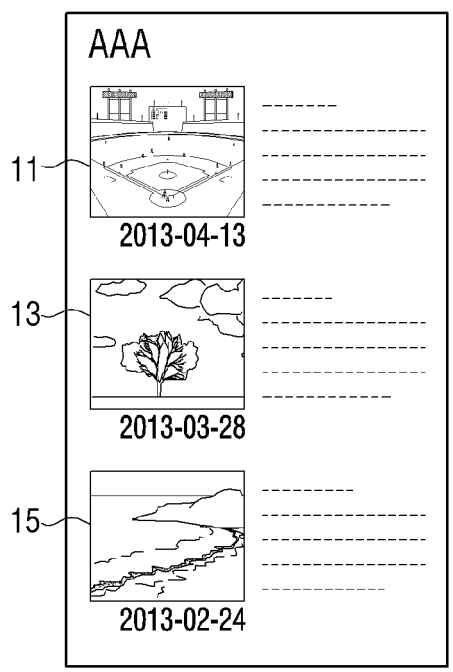
FIGS. 4-6 are views illustrating a method for extracting a curated content according to various exemplary embodiments.

FIG. 4 is a view illustrating a method for extracting a curated content by using content upload date according to an exemplary embodiment.

As described above, in response to a preset event at the terminal apparatus 100, the terminal apparatus 100 transmits user information related to the happened event to the server 200. The terminal apparatus 100 counts the number of server connections, connection duration, or the like. The terminal apparatus 100 stores a server which is frequently connected based on counting result, according to a preset standard. The terminal apparatus 100 may transmit user information to a server frequently connected to receive a curated content.

Referring to FIG. 4, a content uploaded to a server by AAA is illustrated. A first content 11 is a content uploaded on Apr. 13, 2013, a second content 13 is a content uploaded on Mar. 28, 2013, and a third content 15 is a content uploaded on Feb. 24, 2013. As described above, a curated content may be extracted in accordance with the order of uploading a content. Accordingly, when extracting one content, the first content 11 is extracted as a curated content. When extracting two contents, the first and second contents 11, 13 are extracted as a curated content. How many contents will be extracted as a curated content may be determined in accordance with a type of a template displayed at the terminal apparatus 100. Alternatively, the number of curated contents to be extracted may be preset.

Figure 5:
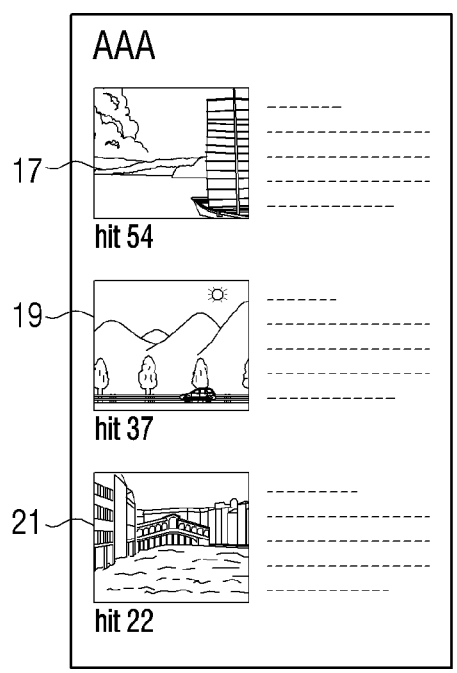

FIG. 5 is a view illustrating a method for extracting a curated content by using user-preference on a content according to an exemplary embodiment.

Referring to FIG. 5, the number of contents and hit records uploaded by AAA to a server are illustrated. The first content 17 is a content having 54 hit records, the second content 19 is a content having 37 hit records, and the third content 21 is a content having 22 hits. Therefore, when extracting one content, the first content 17 is extracted as a curated content. When extracting three contents, the first, the second, and the third contents 17, 19, 21 are extracted. The hit records illustrated in FIG. 5 mean user-preference. That is, it may be the number of recommendations of the corresponding contents by other users, or the number of views of the corresponding contents.

Figure 6:
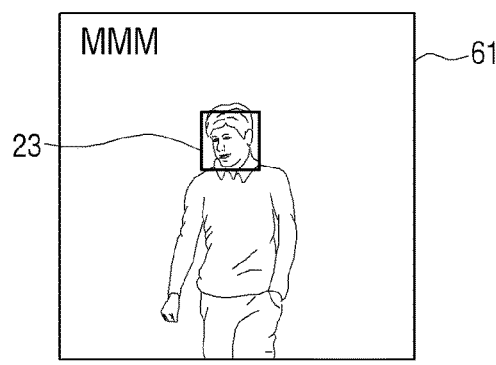
Figure 6:
Figure 6:
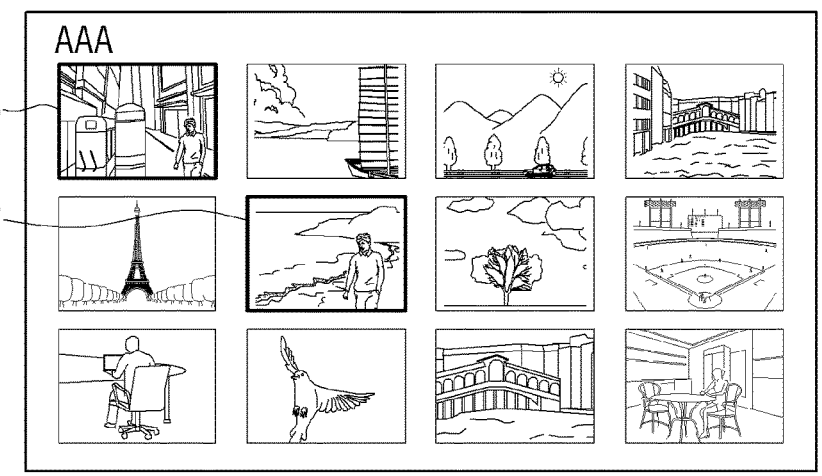

FIG. 6 is a view illustrating a method for extracting a curated content by using an image of a user of a terminal apparatus according to an exemplary embodiment.

According to FIG. 6, an image 61 of MMM who is a user of a terminal apparatus is illustrated. A terminal apparatus extracts the face image 23 from the image 61 of MMM. The extracted image may be stored in a terminal apparatus. As described above, a curated content may be extracted from a terminal apparatus or a server.

When a curated content is extracted from a terminal apparatus, the terminal apparatus transmits user information related to the happened event to a server and receives a content related to a user. That is, when an event related to AAA occurs at a terminal apparatus, the terminal apparatus transmits AAA information to a server, and receives a content related to AAA from a server. The terminal apparatus searches for, from among the received contents, a content including an image matched to the extracted face image 23. In other words, the first content 25 and the second content 27 including the face image 23 of MMM are searched from the received contents. The searched first and second contents are extracted as a curated content.

When a curated content is extracted from a server, a terminal apparatus transmits to a server user information related to the happened event and information on user of a terminal apparatus, and receives a curated content extracted from a server. That is, when an event related to AAA occurs at a terminal apparatus, the terminal apparatus transmits AAA information and the face image 23 of MMM to a server. The server receives information on AAA and the face image 23 of MMM, and searches a content including the face image 23 of MMM from among the contents related to AAA. Accordingly, a curated content is the first and the second contents 25, 27, and a server transmits a curated content to a terminal apparatus.

FIGS. 4-6 illustrate a method for extracting a curated content by using various methods. A curated content may be extracted according to one standard, but also according to two or more standard. For example, standard for extracting curated may be set as content uploading date and user-preference on a content. When two or more standards are set, a content is listed with the first standard having higher priority. When a content having the same priority is listed based on the first standard, a curated content may be extracted by applying the second standard. Or, a certain value may be assigned to a content according to the first standard or the second standard, and the assigned values may be combined. According to size of the combined values, a curated content may be extracted. Alternatively, the certain values of each could be multiplied together, weighted, or input into some other function to derive the assigned value of each content.

A curated content extracted from a server is transmitted to a terminal apparatus. A curated content may be extracted from a terminal apparatus. The terminal apparatus displays the received curated content or extracted curated content.

Figure 7:
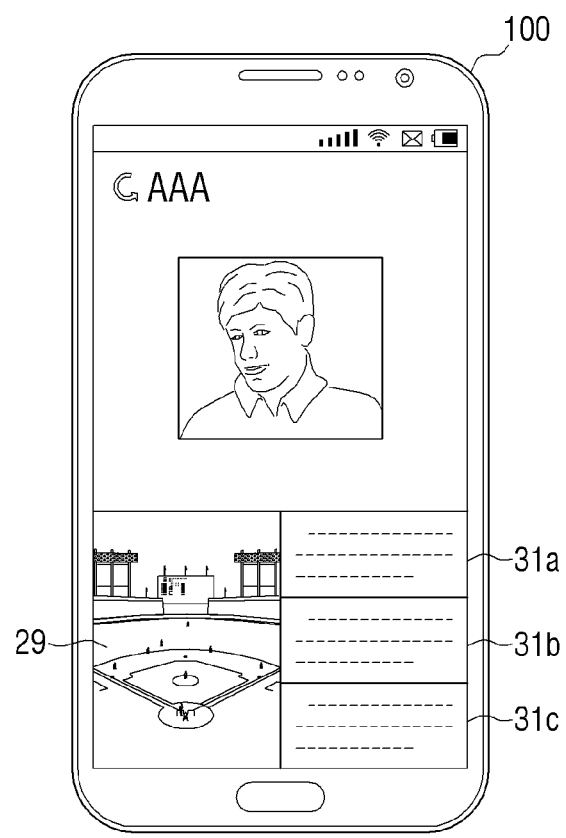
FIGS. 7-8 are views illustrating a curated content related to a phone call receiving event according to various exemplary embodiments.
Figure 8:
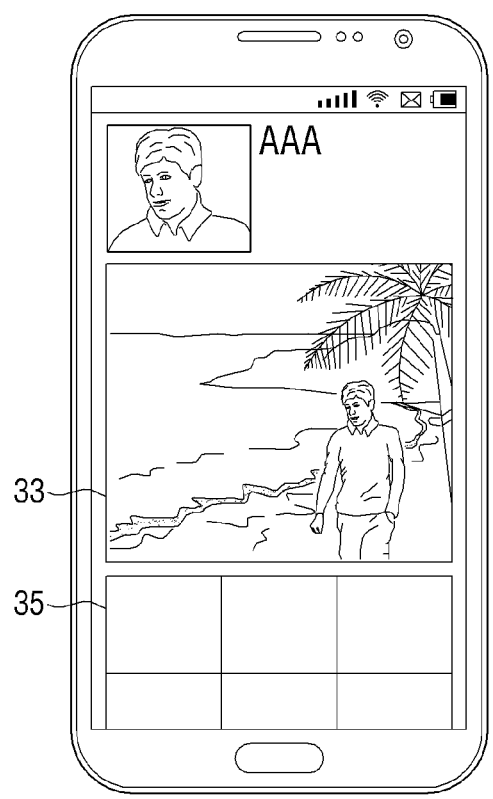

FIGS. 7-8 are views illustrating a curated content related to a phone call receiving event according to various exemplary embodiments.

Referring to FIG. 7, a call from AAA is received by the terminal apparatus 100. The terminal apparatus 100 which receives a call from AAA executes a phone call application. The terminal apparatus 100, on a part of the display 120, may display at least one of a name of AAA, phone number, and an image of AAA stored in a terminal apparatus. The terminal apparatus 100 receives a call from AAA and perceives that a phone call receiving event occurs. Accordingly, the terminal apparatus 100 transmits information of AAA to a server.

When a curated content is extracted from the terminal apparatus 100, a server transmits a content related to received information on AAA to the terminal apparatus 100. In a content related to information of AAA, a curated content to be displayed at the terminal apparatus 100 is included. The terminal apparatus 100 extracts a curated content from among contents related to received information of AAA. Various processes to extract a curated content was explained in FIGS. 4-6, and thus will be omitted.

The terminal apparatus 100 illustrated in FIG. 7 may display one main curated content 29 and a plurality of sub curated contents 31*a*, 31*b*, 31*c*. The terminal apparatus 100 may display one main curated content 29 as an image format, and display the plurality of sub curated contents 31*a*, 31*b*, 31*c* as a text format on a part of an area of the display 120. Or, the plurality of sub curated contents 31*a*, 31*b*, 31*c* may be indicated as an image type.

A curated content related to a phone call receiving event may be extracted in relation to a content of phone call.

Referring to FIG. 8, a screen displayed on the terminal apparatus 100 while conducting a phone call is illustrated. A user of a terminal apparatus performs a phone call with a caller. The terminal apparatus 100 may extract a keyword from phone call while performing call. The terminal apparatus 100 transmits an extracted keyword to a server.

That is, MMM, a user of a terminal apparatus, makes a conversation regarding a recent trip with a caller AAA. The terminal apparatus 100 extracts a keyword related to 'trip', and transmits to a server an extracted keyword. The server searches a content related to the received keyword from among the contents related to AAA. The server may search a trip photo content 33, and extracts the photo content as a curated content. The server transmits the extracted photo content 33. The terminal apparatus 100 receives the trip photo content 33 transmitted by a server and displays on an area of the display 120.

The terminal apparatus 100 may display a control button 35 which is capable of controlling a telephone application on one area of the display 120. In some cases, the displayed control button 35 may include a button that can control a curated content. For example, the button that can control a curated content may be a button for increasing/decreasing, server access, reproduction of a moving image, next/previous images, etc.

The terminal apparatus 100 may extract a keyword from a phone call and transmit the keyword to a server. The keyword may be extracted in real time. The server may extract a curated content related to a transmitted keyword and transmit the curated content to the terminal apparatus 100. The terminal apparatus 100 may display the received curated content on a real time basis. Accordingly, the terminal apparatus 100, while performing a phone call, may change a curated content successively and display the curated content. As to the keyword extraction, the terminal apparatus 100 may extract a word which is repeated over preset times as a keyword. If the server, though receiving a keyword from the terminal apparatus 100, fails to extract a curated content related to a keyword, may transmit a signal to the terminal apparatus 100 that there is no adequate curated content.

As described above, a preset event may be an anniversary alarm event or a nearing preset time event. For example, an anniversary alarm event may be a birthday alarm event or a wedding anniversary alarm event. A nearing preset time event may be an event which is set like as 07:00 AM and 10:00 PM, happening when a preset time nears.

Figure 9:
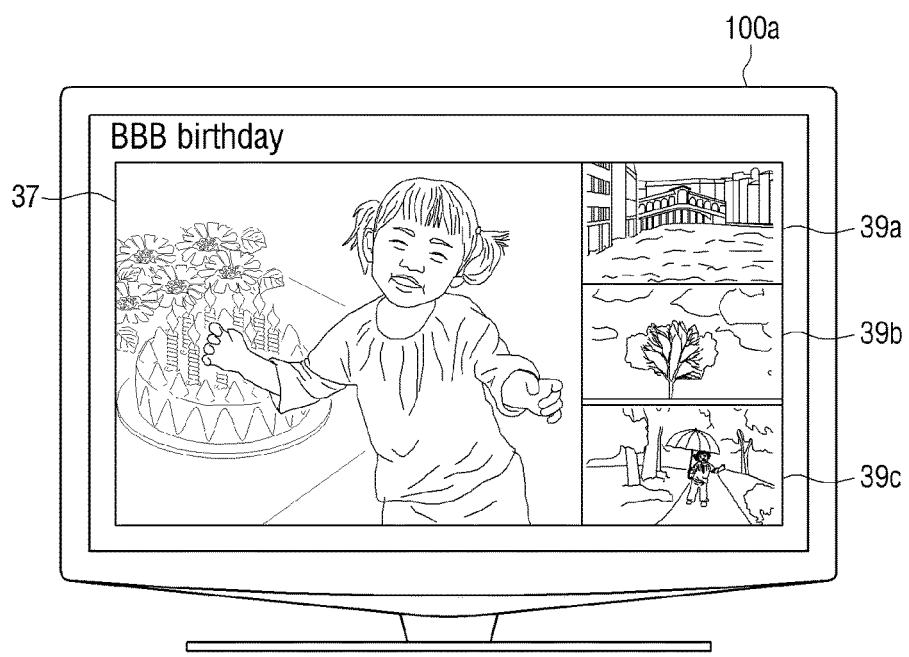
FIGS. 9-10 are views illustrating a method for displaying a curated content according to various exemplary embodiments.

Referring to FIG. 9, in response to a birthday alarm event, a screen displayed on a terminal apparatus is illustrated. As described above, a terminal apparatus may be a cell phone, a smartphone, a PDA, a tablet, a TV, or the like. The terminal apparatus 100a executes, in response to a birthday of BBB nearing, a birthday alarm application. The terminal apparatus 100a transmits information related to BBB to a server. The server transmits to the terminal apparatus 100a a content related to BBB based on the received information on BBB. The terminal apparatus 100a extracts a curated content from among the received contents.

The terminal apparatus 100a may extract a main curated content 37 and a plurality of sub curated contents 39a, 39b, 39c. One main curated content 37 may be displayed on a larger area of a screen, and the plurality of sub curated contents 39a, 39b, 39c may be displayed on a part of an area of the display of the terminal apparatus 100a. Additionally, the terminal apparatus 100a may display a control menu which may input a control command. For example, a control menu may be a call menu with the other party, a server connection menu, a moving image reproduction menu, an entire image display menu, or the like.

The terminal apparatus 100a may display a curated content by another method.

Figure 10:
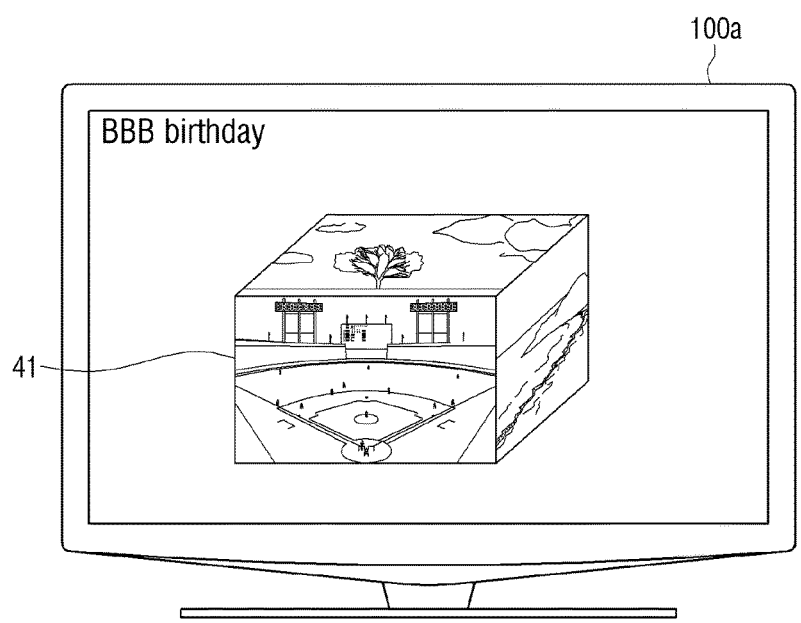

Referring to FIG. 10, a curated content 41 in 3D cube format is illustrated. The 3D cube format displays a curated content in a multi-dimensional way. A user may control the 3D format curated content 41 by using a touch gesture which touches a screen, a space gesture which inputs a motion through a camera, or the like. That is, a user may rotate and unfold the 3D format curated content 41. In addition, one curated content may be selected, and the terminal apparatus 100a may display the selected curated content on an entire screen.

It has been explained that a curated content is extracted by the terminal apparatus, but a curated content may be extracted by a server and transmitted to the terminal apparatus.

In addition, though not illustrated, a preset event may be a nearing preset time event. In this case, a curated content may be extracted from a category selected by a user or a category frequently connected by a user. For example, a category selected by a user or a category frequently connected by a user may be weather, baseball, and an economics category. The terminal apparatus, when a preset time nears, may request a curated content to a server, and receive data such as weather information, baseball game result, economic news, etc. as a curated content. In this case, a server may be an information providing server. The terminal apparatus receives and displays a curated content.

When the terminal apparatus displays a curated content, a received content may be displayed as it is, or resized content may be displayed. Or, the terminal apparatus may additionally reconstitute and display an image.

Figure 11:
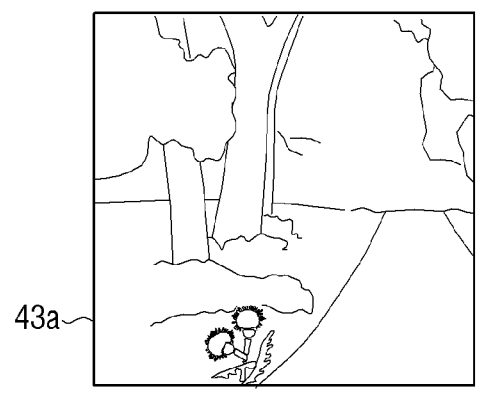
FIG. 11 is a view illustrating reconstitution of an image according to an exemplary embodiment.
Figure 11:
Figure 11:
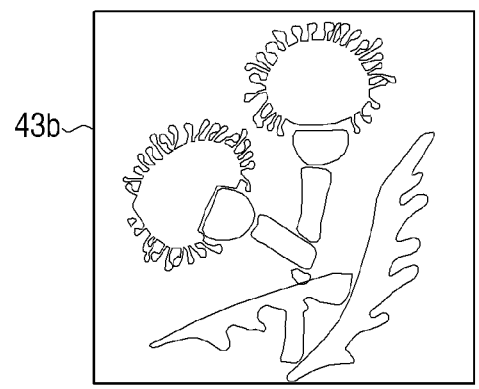

FIG. 11 is a view illustrating reconstitution of an image according to an exemplary embodiment.

In FIG. 11, the received original image 43a is illustrated. The image 43a is an image of a flower, including backgrounds of road and street trees. If the size of image needs to be reduced in order to be displayed at the terminal apparatus, the size of the flower included in the original image 43a may be reduced to the extent that it is no longer perceivable.

Accordingly, the terminal apparatus may analyze the received original image 43a and perform retargeting. The retargeting means to decide a core subject of an image and reconstitute the image centering on the core subject. That is, the terminal apparatus may decide flower of the original image 43a is the core subject and generate a retargeting image 43b. The terminal apparatus may display the retargeting image 43b as a curated content.

Reconstitution of an image may include cropping, image enhancement, saturation compensation, etc. Cropping means cutting a certain area of an image or cutting a certain area of an image and reconstituting a remaining area of the image. Image enhancement means making an image clearer. Saturation compensation means, when there is a certain area of an image whose luminance is over a describable luminance, adjusting luminance of an entire image. The terminal apparatus may perform a plurality of image processing processes and display the reconstituted image as a curated content.

In addition, the perception technology on a curated content may be preceded. A curated content includes at least one of a text and an image. The perception technology may perceive a text included in a curated content and grasp meaning of the text. Also, the perception technology may perceive brightness, color, luminance, object, correlation, or face of an included image. Perception of an object means that whether or not an object of an image is a material, a person, or an animal. In case of perceiving face of a person, by using a perceived face image, an image in which the same person is included may be extracted from among other images. Moreover, face perception technology may perceive facial expression. For example, perception of correlation may include that a photographing subject of an image is whom or what, and that frequency of a photographing subject of each content which frequently shows up is grasped. In addition, the correlation perception technology, by using information obtained from other user information or other contents, may include determining which relation the photographing subject has regarding a user. For example, in case of a family photo, a photographing subject on a photo may be grasped as father or mother, etc.

The terminal apparatus, by using the perception technology, may perform perception process on a text or an image included in a curated content and reconstitute a curated content. An image includes both a dynamic image (ex, a moving image) and a still image (ex, a still cut). The terminal apparatus may perform image processing after performing perceiving process. Until now, the process of extracting a curated content and displaying the extracted curated content by the terminal apparatus has been explained.

Meanwhile, as described above, by perceiving brightness, color, luminance of an image included in a curated content and adding the interaction effect thereof, the interaction effect may be changed according to a user manipulation. This will be explained in higher detail.

Figure 12:
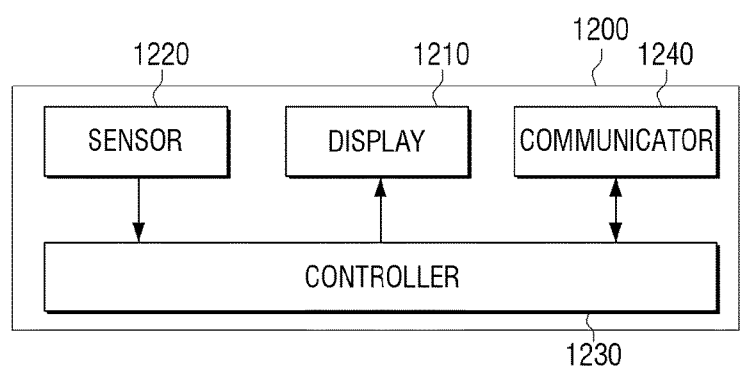
FIG. 12 is a block diagram illustrating the configuration of a terminal apparatus according to an exemplary embodiment.

FIG. 12 is a block diagram illustrating a configuration of the terminal apparatus according to an exemplary embodiment.

Referring to FIG. 12, the terminal apparatus 1200 may include a display 1210, a sensor 1220, a controller 1230, and a communicator 1240.

The display 1210 may display a screen of a content. To be specific, the display 1210 may display a still image, a moving image, a text, or the like.

The sensor 1220 may sense a user manipulation. For example, the sensor 1220 may include a touch sensor, an acceleration sensor (Gyro sensor), pressure sensor, GPS, proximity sensor, a gesture sensor, terrestrial magnetism sensor, or the like.

In addition, the sensor 1220 may detect a user manipulation according to type of a sensor. For example, the touch sensor may detect a manipulation to touch a touch screen by a user, the acceleration sensor may detect a user manipulation to tilt or rotate the terminal apparatus 1200, and the pressure sensor may detect a user manipulation to blow wind to the terminal apparatus will 1200.

Moreover, the GPS may detect a movement of the terminal apparatus 1200, the proximity sensor may detect a location when an object approaches, for example, switching operation may be executed when a user's hand or a certain object comes to a certain location. The gesture sensor may detect a user gesture, the geomagnetic sensor may detect terrestrial magnetism and manipulation according to magnetic field or flow of electric current. The acceleration sensor may detect a user manipulation, such as a shake.

The controller 1230 may extract at least one object within a screen. To be specific, the controller 1230, in order to determine whether or not there is any object which can add the interaction effect, may find out a part to which motion, emotion, or extend-view can be added.

Herein, the object may include at least one of a material, face, or text displayed on a screen. That is, a material, face, or text to which the interaction effect may be added can be extracted as an object.

Meanwhile, in order to determine whether or not there is any object to which the controller 1230 may add the interaction effect, the perception technologies such as individual perception of an object, person, animal, perception of correlation, perception of an object or face, perception of facial expression, perception of text, or perception of brightness may be performed.

These perception technologies are different from detection technologies. In other words, to detect an object is to detect whether or not there is an object to find out within an image. For example, whether or not face is included within an image or at which location the face is located is detected.

Compared to this, perception of an object is to compare the features of an object found out within an image, that is a detected image, with the features of other objects, and find out what the object found out from the image is. For example, the perception may indicate whose face is found in the image. Therefore, in order to perceive an object, a GT (Ground Truth) database may be required.

Accordingly, the process to perceive a moving object is as shown below.

First of all, by comparing the previous frame and the present frame within an image, movement of a pixel may be forecast and compared, and accordingly, movements of an object may be detected. In addition, when there are a plurality of moving objects within an image, moving objects which are subject to perception may be selected in consideration of quantity of movements or location/angle of moving subjects.

In addition, by comparing the selected moving object with a database, they can be perceived as a certain object.

Accordingly, the controller 1230 may extract at least one object within a screen.

In addition, the controller 1230 may generate the interaction effect where the display state of an object changes according to a user manipulation. That is, a content may be analyzed based on the aforementioned perception technology. For example, meaning of text along with an image or a moving image may be grasped, and repetitive rhythm in audio data may be analyzed and extracted.

Moreover, the controller 1230 may find out various sensors included by the sensor 1220 at the terminal apparatus 1200 which reproduces a content. In other words, the controller may generate the interaction effect which may be utilized based on the extracted object and the found out various sensors.

For example, the controller 1230 may analyze a scene in which an umbrella is blown with wind, or fog flows, and extract an object corresponding to the scene. The controller 1230 may determine a sensor 1220 which may correspond to the scene in which an umbrella is blown with wind or fog flows. If, the pressure sensor is determined, the controller 1230, in response to the pressure sensor sensing a pressure, may generate the interaction effect that an umbrella is blown with wind or fog flows. The user may cause the pressure by blowing on the terminal apparatus 1200.

In addition, the controller 1230 may add the interaction effect to a content and process the effect. According to the afore-mentioned description, a certain content determined in accordance with degree of interest of a user which is determined based on a certain standard is called a curated content. Herein, the content to which the interaction effect is added and processed accordingly may be an example of the aforementioned curated content.

Meanwhile, the controller 1230 may generate metadata to indicate such interaction effect, add the metadata to a content, and process the content accordingly. That is, the controller 1230 may generate information on the interaction effect as metadata, add the generated metadata to a content, and process the content.

In addition, the controller 1230 may generate various interaction effects, for example, a content or luminance of an object may be adjusted in accordance with a user manipulation. To adjust a content in accordance with a user manipulation means that the reproduction direction of a content or details of the content itself are changed by user manipulation. For example, the controller 1230, when a user rubs one object included in a screen of a content which is being reproduced with the hand, may generate the interaction effect such as moving the object only or enlarging the object.

Or, when a user rubs the sun included in a content where the sun lights up seashore by the hand, the controller 1230 may generate the interaction effect that brightness of the sun increases further in accordance with the user manipulation of rubbing by the hand.

When a user takes a motion of touching or flicking a balloon included in a content where a screen, in which a balloon floats in the air, is reproduced, the controller 1230 may generate the interaction effect of bursting the balloon in accordance with the user manipulation of touching or flicking the balloon.

Meanwhile, the controller 1230 may add sound effect to a content in accordance with user manipulation. For example, if the piano is included in a screen where a content is reproduced, when a user touches the piano, the controller 1230 may generate the interaction effect of producing music in accordance with the user manipulation of touching the piano.

In addition, the controller 1230 may store information on an indicator which indicates an object to which the interaction effect is added in a metadata. That is, the controller 1230 may display an indicator which displays a part showing the interaction effect to a user on a screen where a content is reproduced, and such information on the indicator may be stored in the metadata.

Meanwhile, the controller 1230, when a user does not input a user manipulation within a certain period of time regarding a content to which the interaction effect is added and processed accordingly, the content may automatically reproduce the content itself without the interaction effect, or may reproduce a preset interaction effect. The certain period of time may be set by a user, and the effect which is displayed when a user manipulation is not input within the certain period of time may be set by a user. Alternatively, the period of time and predetermined effect may be set in the metadata.

The communicator 1240 may transmit a processed content to an external apparatus. Specifically, the controller 1230 may add the interaction effect to be changed in accordance with the user interaction to a content and process the content, and transmit the content to an external apparatus through the communicator 1240.

Herein, an external apparatus may be a server, or another terminal apparatus. When a server is an external apparatus, the communicator 1240 may upload the processed content to a Web bulletin board, SNS, or the like. In addition, when another terminal apparatus is an external apparatus, the communicator 1240 may transmit the processed content to the other terminal apparatus.

Figure 13:
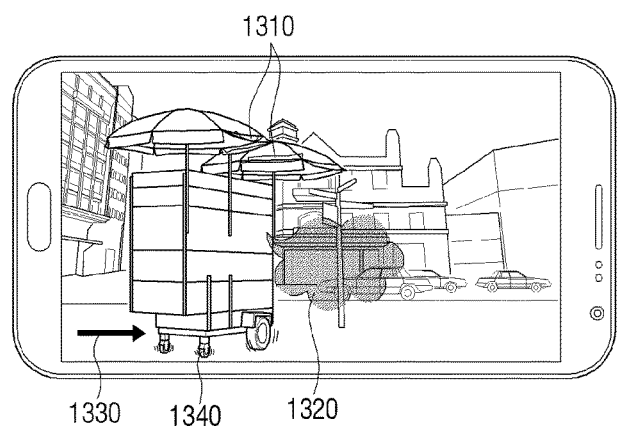
FIG. 13 is a view illustrating a screen where a content provided with an interaction effect is displayed according to an exemplary embodiment.

FIG. 13 is a view illustrating a screen where a content added with the interaction effect is displayed according to an exemplary embodiment.

According to FIG. 13, a screen where a stall 1340 stands on a road is displayed. Herein, the controller 1230 may forecast movements of a pixel by comparing the previous frame and the present frame within an image, and accordingly, extract the stall 1340 as one object. Moreover, the controller 1230, may generate the interaction effect that, when a user pushes the stall 1340 as an extracted object on a touch screen to one side 1330, the stall 1340 moves on a screen.

In addition, the controller 1230 may forecast the movements of a pixel by comparing the previous frame with the present frame within an image, and accordingly extract the umbrella 1310 attached to the stall 1340 as one object. Moreover, the controller 1230, in response to the pressure sensor sensing a pressure, may generate the interaction effect that the umbrella 1310 flutters and moves on a screen. The pressure sensor may be activated by a user blowing on the terminal apparatus 1200.

The controller 1230, by comparing the previous frame and the present frame within an image, may forecast of the movements of a pixel, and accordingly, generate the fog 1320 from the stall 1340 as one object. Moreover, the controller 1230, based on the acceleration sensor detecting a tilt of the terminal apparatus, may generate the interaction effect that the fog 1320 flows along the tilted direction.

Figure 14:
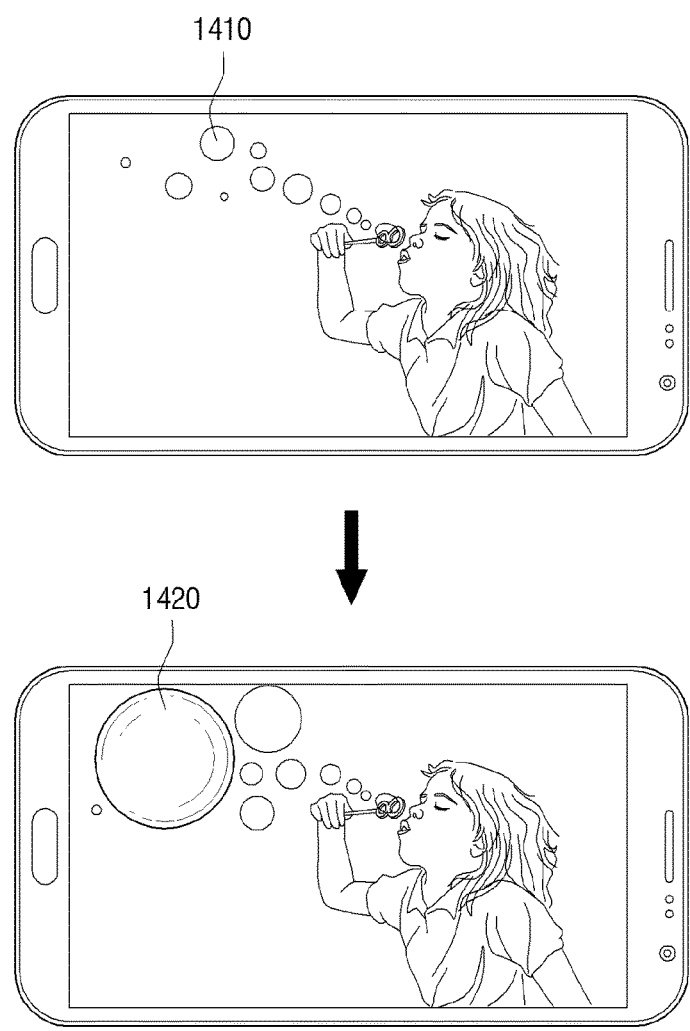
FIG. 14 is a view illustrating a screen where a content added with an interaction effect is displayed according to another exemplary embodiment.

FIG. 14 is a view illustrating a screen which displays a content added with the interaction effect according to still another exemplary embodiment.

In FIG. 14, a content in which a boy makes a bubble 1410 is being reproduced. Herein, the controller 1230 may forecast the movements of a pixel by comparing the previous frame with the present frame within an image, and accordingly, extract the soap bubble, which is getting bigger, as one object. Moreover, the controller 1230, based on the pressure sensor detecting a pressure, may generate the interaction effect that a bigger soap bubble 1420 appears on a screen. The pressure sensor may be activated by a user blowing on the terminal apparatus 1200.

In addition, the controller 1230, as described above, may add the generated interaction effect to a content, process the content, and transmit the processed content to a server or the other terminal apparatus.

Figure 15:
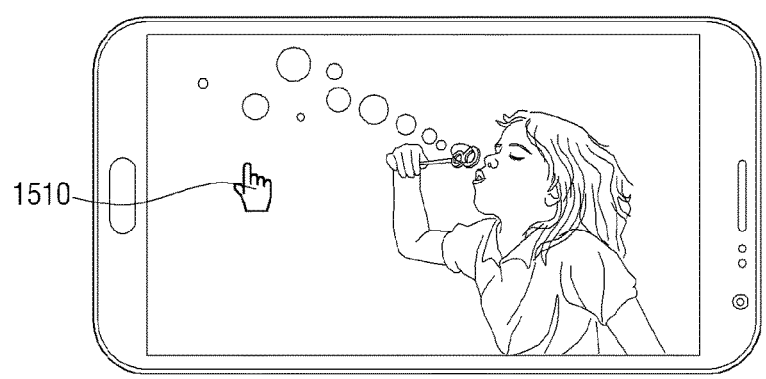
FIG. 15 is a view illustrating an indicator which displays an object added with an interaction effect according to an exemplary embodiment.

FIG. 15 is a view illustrating an indicator which displays an object added with an interaction effect according to an exemplary embodiment.

According to FIG. 15, an icon 1510 in a shape of the hand is displayed, which indicates that the interaction effect described in FIG. 4 is added to a content. That is, a user, when confirming that the icon 1510 in a shape of the hand is displayed nearby the soap bubble, may notice that a certain effect may be generated regarding the soap bubble through the manipulation using the hand.

In FIG. 15, the icon 1510 in a shape of the hand is displayed, but another shape icon also may be displayed instead of, or in addition to the hand icon. Different icons may be displayed based on the type of interaction effect. Also, in one single screen, a plurality of icons indicating that a plurality of interactions are added may be displayed.

Figure 16:
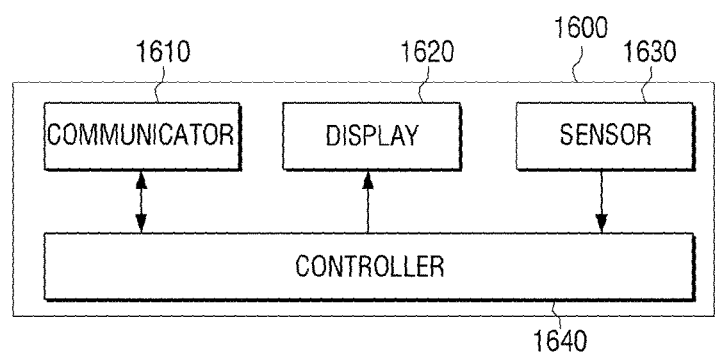
FIG. 16 is a block diagram illustrating the configuration of a terminal apparatus according to an exemplary embodiment.

FIG. 16 is a block diagram illustrating the configuration of a terminal apparatus according to an exemplary embodiment.

According to FIG. 16, the terminal apparatus 1600 may include a communicator 1610, a display 1620, a sensor 1630, and a controller 1640.

The communicator 1610 may receive a content including an object added with a first interaction effect. That is, the communicator 1610 may receive a content which is added with a first interaction effect provided by another terminal apparatus and processed accordingly.

In addition, the display 1620 may display a content. The display 1620 may display a content including an object added with the first interaction effect.

Specifically, the display 1620, while displaying a screen corresponding to the content itself, when a user interaction corresponding to the first interaction effect is detected, may display the first interaction effect.

For example, as described in FIG. 14, the display 1620 may reproduce a scene of a boy making a bubble, where the bubble is an object added with a first interaction effect. Also, the display 1620, when a user blows on the terminal apparatus 1600, may reproduce a scene that the bubble corresponding to the first interaction effect gets bigger. In addition, as described above, the display 1620, if a user manipulation is not detected for a certain period of time, may reproduce a scene which corresponds to the content itself, or reproduce a scene corresponding to the first interaction effect.

The sensor 1630 may detect a user manipulation. The type of the sensor has been described earlier, and thus further descriptions are omitted.

The controller 1640 may generate a second interaction effect which changes a display state of an object according to a user manipulation, add the second interaction effect to a content, and reprocess the content.

Specifically, the controller 1640 may reprocess a content, by generating and adding a second interaction effect which changes a display state of an object according to a user manipulation to the content added with the first interaction effect received through the communicator 1610. Referring back to FIG. 13, it may be a process of generating a content including a plurality of the interaction effects. That is, when a controller of the first terminal apparatus, inputs a touch of pushing the stall 1340 by the hand, the first interaction effect in which the stall 1340 moves is generated and stored as metadata, and the generated metadata is added to a content and processed, and then transmitted to the second terminal apparatus. Then, a controller of the second terminal apparatus may reproduce a content added with the received metadata, and when a touch of pushing the stall 1340 is input, the first interaction effect of moving the stall 1340 may be displayed.

In addition, a controller of the second terminal apparatus, from among a plurality of objects included in the received content, may detect the umbrella 1310 as a moving object. When a touch input or pressure is detected, the second interaction effect that the umbrella 1310 flutters may be generated and added to the received content.

Accordingly, the second terminal apparatus, by adding another interaction effect to the content added with the interaction effect received by the first terminal apparatus, may reprocess a content.

Figure 17:
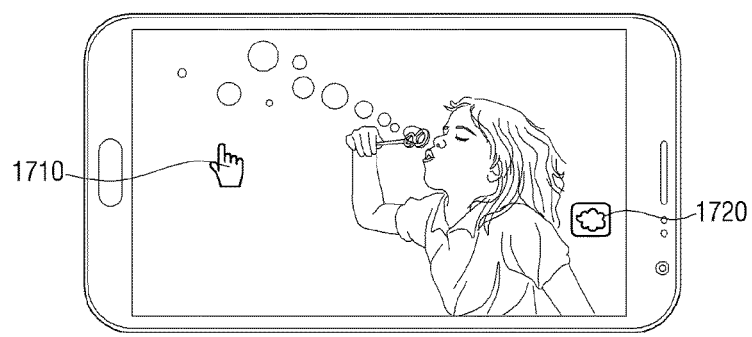
FIG. 17 is a view illustrating a screen which displays a content added with another interaction effect according to an exemplary embodiment.

FIG. 17 is a view illustrating a screen which displays a content added with another interaction effect according to an exemplary embodiment.

According to FIG. 17, in a screen where a content is reproduced, an indicator 1710 in the shape of the hand which indicates that the first interaction effect is added is displayed, and an indicator 1720 in the shape of breath which indicates that the second interaction effect is added is displayed.

In other words, the indicator 1710 in the shape of the hand which is displayed near the bubble indicates that the first interaction effect on the bubble is added to a content, and the first interaction effect is generated and added by the first terminal apparatus. Accordingly, the second terminal apparatus receives a content where the indicator 1710 in the shape of the hand which indicates that the first interaction effect is added is displayed.

In addition, a controller of the second terminal apparatus may detect hair of a boy as one object, and, based on a pressure sensor detecting a pressure, may generate the second interaction effect to move the hair of the boy. The pressure sensor may be activated by blowing on the terminal apparatus. Moreover, a controller of the second terminal apparatus may reprocess a content by adding the second interaction effect to the received content, and display the indicator 1720 in the shape of breath icon which indicates that the second interaction effect is added.

Meanwhile, in the aforementioned example, it has been described that the first interaction effect and the second interaction effect are generated for the objects different from each other, but they may be generated for the same object by different user manipulations.

That is, the controller 1640 may generate different interaction effects based on different sensors which detect different user manipulations for the same object.

For example, for a content with a first interactive effect of displaying movements of candlelight, in response to a user shaking a device, the controller 1640 may add the second interaction effect displaying movements of candlelight in response to a user blowing on the device.

Figure 18:
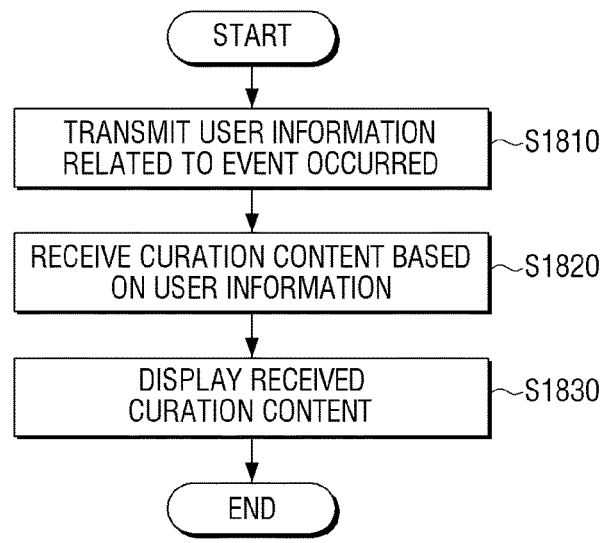
FIG. 18 is a flow chart illustrating a method for displaying a content of a terminal apparatus according to an exemplary embodiment.

FIG. 18 is a flow chart illustrating a method for displaying a content of a terminal apparatus according to an exemplary embodiment. Referring to FIG. 18, the terminal apparatus transmit user information related to a happened event to a server (S1810). The happened event may be a phone call receiving event, an anniversary alarm event, a nearing present time event, etc. The terminal apparatus, when an event occurs, executes an application related to the happened event. For example, in the case of a phone call receiving event, a telephone application may be executed. In the case of a phone call receiving event, user information may be information on a caller.

The terminal apparatus receives a curated content based on user information (S1820). When a server extracts a curated content, the terminal apparatus receives the extracted curated content. When the terminal apparatus extracts a curated content, the terminal apparatus receives a content which is related to user information and includes a curated content.

The terminal apparatus displays a received curated content (S1830). The terminal apparatus may reconstitute and display an image included in a curated content. Reconstitution of an image may include retargeting, crop, image enhancement, saturation compensation of an image, or the like.

Meanwhile, when a content is related to a text, a content may change according to a comment or reply of a user on SNS. That is, a server or a controller may reflect the user comments or replies to a content in a comprehensive manner.

For example, when a content is a text related to famous restaurants, a server or a controller may change, store, and transmit a text in consideration of a list of the recommended restaurants or user-preference according to user comments or replies on SNS. Hereinbelow, a method for displaying the terminal apparatus and a method for controlling a server which extracts a curated content are explained.

Figure 19:
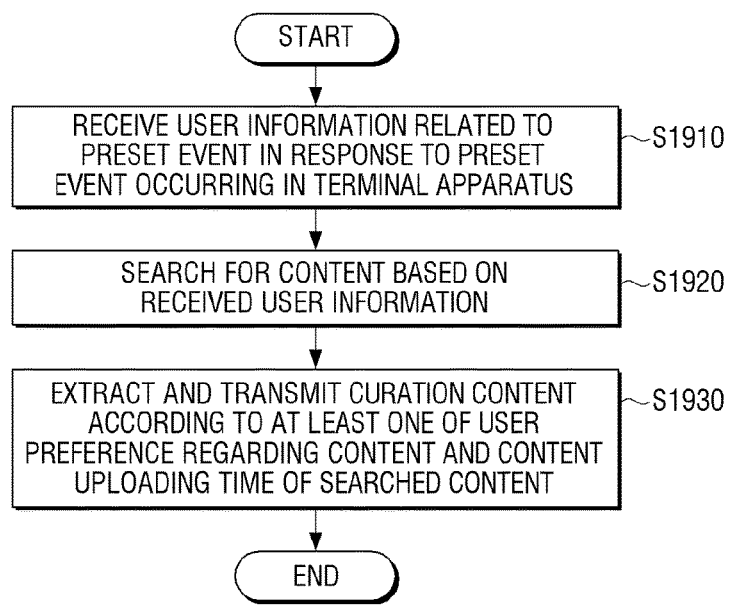
FIG. 19 is a flow chart illustrating a method for controlling a server according to an exemplary embodiment.

FIG. 19 is a flow chart illustrating a method for controlling a server according to an exemplary embodiment.

Referring to FIG. 19, in response to a preset event at the terminal apparatus, a server receives user information related to the preset event (S1910). The server searches content based on the received user information (S1920). The server may be an SNS server or a server providing information.

The server extracts curated content according to at least one of the user-preference or content uploading date, from among the searched contents, and transmits the content to the terminal apparatus (S1930). As non-limiting examples, the user-preference on a content may be determined based on the number of clicks of a content, number of downloads, number of views, number of recommendations, or the like. A curated content may be set based on whether an image of a user of the terminal apparatus is included, a category selected by a user of the terminal apparatus, relevance with recently-uploaded content by a user of the terminal apparatus, or the like. A curated content may include at least one of an image and a text. In addition, one or more curated content may be extracted.

In one or more exemplary embodiments, a content related to user information includes information and data related to user information.

A method for displaying a content of the terminal apparatus according to aforementioned various exemplary embodiments may be realized as a program and provided to the terminal apparatus.

Figure 20:
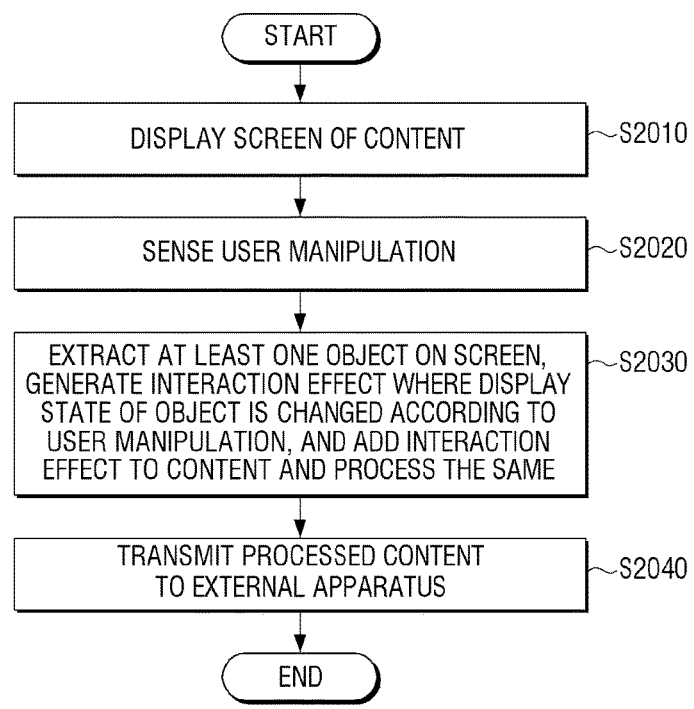
FIG. 20 is a flow chart illustrating a method for controlling a terminal apparatus according to an exemplary embodiment.

FIG. 20 is a flow chart illustrating a method for controlling a terminal apparatus according to an exemplary embodiment.

According to FIG. 20, the terminal apparatus may display a screen of a content (S2010).

In addition, the terminal apparatus may detect a user manipulation (S2020).

Also, the terminal apparatus may extract at least one object within a screen, generate an interaction effect where a display state of an object changes according to user manipulation, and add and process the interaction effect to a content (S2030).

Herein, the processing may include generating metadata to indicate the interaction effect, and adding the metadata to a content.

The processing may add sound effect to a content according to user manipulation.

In addition, the processing may store information on an indicator which indicates an object added with the interaction effect to metadata.

Also, an object may include at least one of a material, face, text displayed on a screen.

Meanwhile, the interaction effect may be an effect which adjusts luminance of a content or an object according to user manipulation.

Also, the terminal apparatus transmits the processed content to an external apparatus (S2040).

Figure 21:
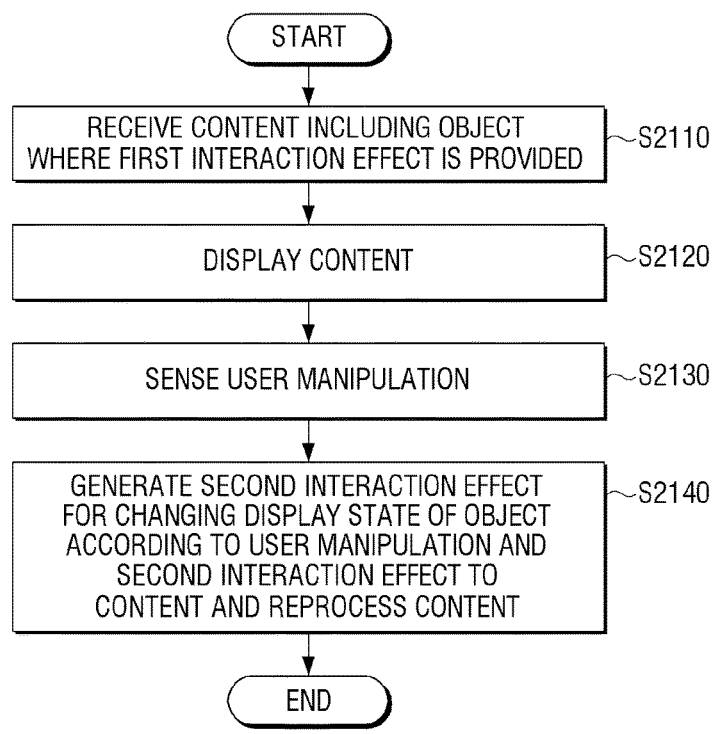
FIG. 21 is a flow chart illustrating a method for controlling a terminal apparatus according to an exemplary embodiment.

FIG. 21 is a flow chart illustrating a method for controlling a terminal apparatus according to an exemplary embodiment.

According to FIG. 21, the terminal apparatus may receive a content including an object added with the first interaction effect (S2110).

In addition, the terminal apparatus may display a content (S2120).

In addition, the terminal apparatus may detect user manipulation (S2130).

Meanwhile, the terminal apparatus may generate the second interaction effect which changes a display state of an object according to user manipulation, add the second interaction effect to a content, and reprocess the content (S2140).

Meanwhile, various exemplary embodiments will be explained in relation to receiving the incoming call that includes the caller identification information, executing the connecting application corresponding to the caller identification information, and displaying the search result related to the contact object information on the screen of the executed connecting application explained with reference to FIG. 2B.

Figure 22:
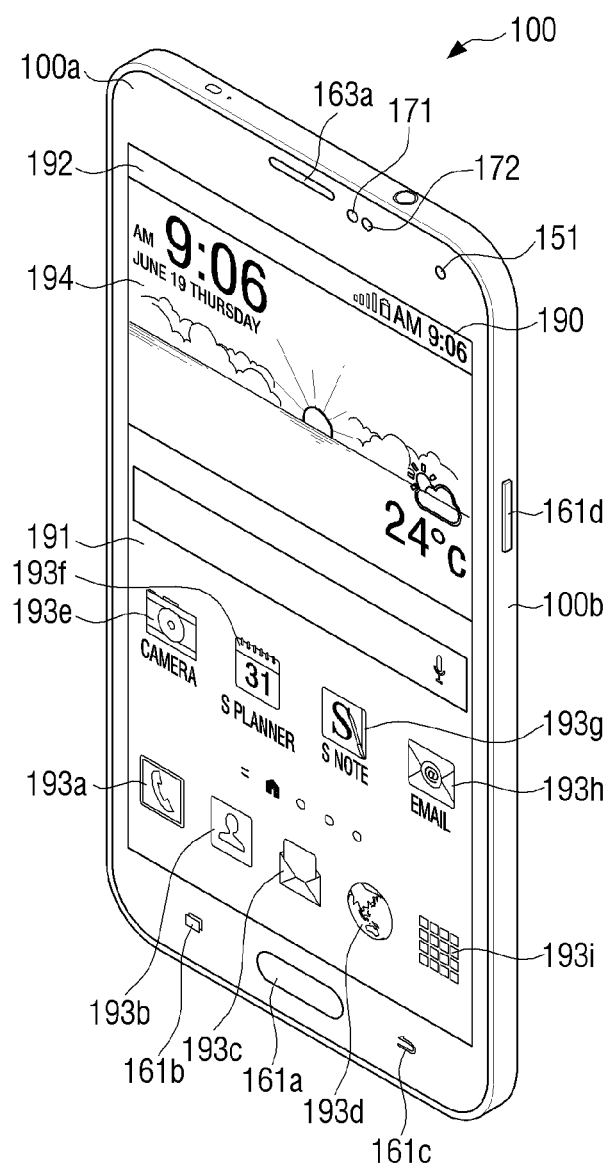
FIG. 22 is a schematic perspective view illustrating a terminal apparatus according to an exemplary embodiment.
Figure 23:
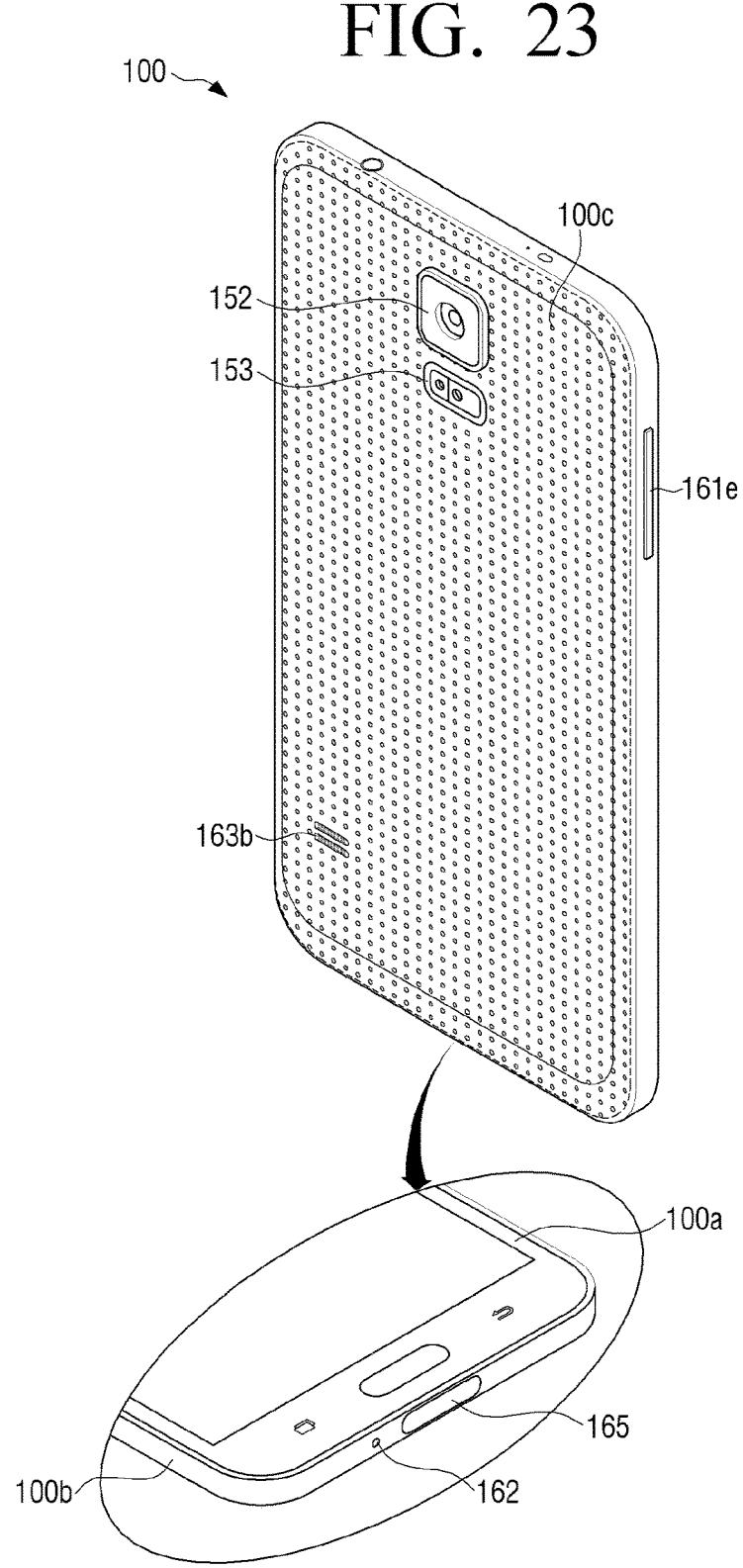
FIG. 23 is a schematic rear surface perspective view illustrating a terminal apparatus according to an exemplary embodiment.

FIG. 22 is a schematic perspective view illustrating a terminal apparatus according to an exemplary embodiment, and FIG. 23 is a schematic rear surface perspective illustrating a terminal apparatus according to an exemplary embodiment.

FIGS. 22 and 23 illustrate a terminal apparatus embodied as a mobile terminal apparatus according to an exemplary embodiment of the present disclosure, but there is no limitation thereto, and thus the terminal apparatus may of course be embodied as any display apparatus capable of implementing a telephone call receiving function, storage function, display function, and application program execution function.

Referring to FIGS. 22 and 23, a home screen 191 is displayed on a touch screen 190 in a central area of a front surface 100a of the terminal apparatus 100. The terminal apparatus 100 may have a plurality of different home screens. On the home screen 191, a shortcut icon (193a to 193h), menu icon 193i, or a weather and time widget 194 corresponding to an application selectable by a touch may be displayed. On a top end of the home screen 191, a status bar 192 that displays a state of battery charge, intensity of receiving signals, and current time of the terminal apparatus 100 may be displayed. Furthermore, the status bar 192 of the home screen 191 may be positioned at a bottom end of the status bar 192 or only the home screen 191 may be displayed without displaying the status bar 192.

On an upper part of the front surface 100a of the terminal apparatus 100, a first camera 151, a plurality of speakers 163a, an illumination sensor 171, and a proximity sensor 172 may be disposed. On a rear surface 100c of the terminal apparatus 100, a second camera 152, flash 153, or speaker 163b may be disposed.

On a lower part of the front surface 100a of the terminal apparatus 100, a menu button 161b, and back button 161c are disposed. The menu button 161b may be substituted by an app button recently implemented. The button 161 may be displayed within the touch screen 190. Furthermore, the button 161 may be displayed together with other icons or text within the touch screen 190.

Meanwhile, on a side 100b of the upper part of the terminal apparatus 100, a power/lock button 161d, volume button 161e, and a plurality of microphones 162 may be disposed. The connector 165 disposed on a side of the lower part of the terminal apparatus 100 may be connected with an external apparatus wiredly. Furthermore, on the side of the upper part of the terminal apparatus 100, an insert hole (not illustrated) where an input pen (167, see FIG. 24) that includes a stylus pen or touch pen may be inserted may be disposed. The input pen 167 may be kept inside the terminal apparatus 100 through the insert hole (not illustrated), and may be withdrawn from the terminal apparatus 100 for use.

To the components of the terminal apparatus 100 illustrated in FIGS. 22 and 23, at least one component may be added or removed in accordance with the performance of the terminal apparatus 100. Furthermore, those skilled in the art would easily understand that the location of the components may be changed depending on the performance or structure of the terminal apparatus 100.

Figure 24:
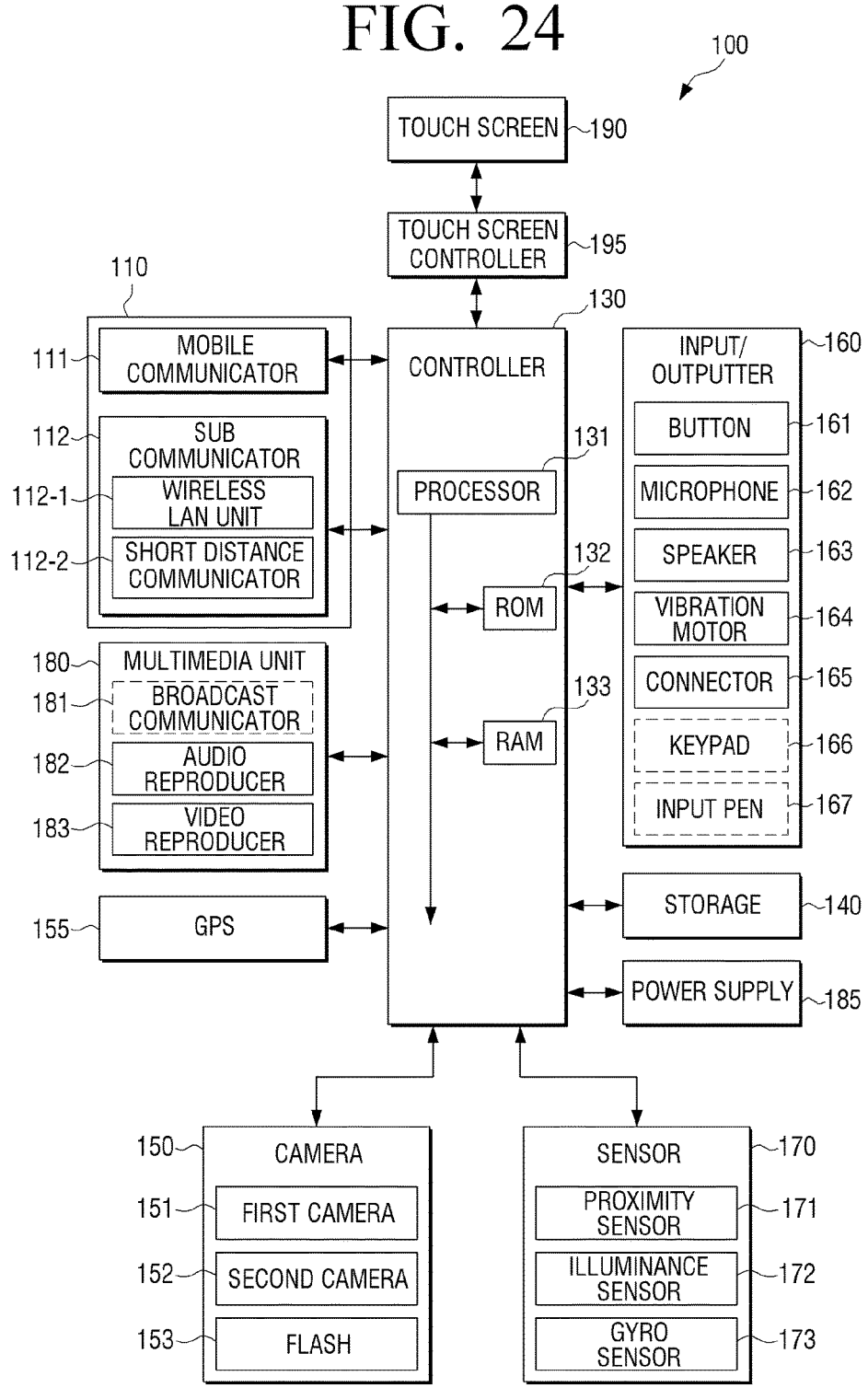
FIG. 24 is a schematic block diagram illustrating a terminal apparatus according to an exemplary embodiment.

FIG. 24 is a schematic block diagram illustrating another terminal apparatus according to an exemplary embodiment of the present disclosure.

Referring to FIG. 24, the terminal apparatus 100 may be connected to an external apparatus (not illustrated) wiredly or wirelessly using a mobile communicator 111 and sub communicator 112, and connector 165 that form the communicator 110.

Herein, the terminal apparatus may include a mobile phone (not illustrated), smart phone (not illustrated), MP3 player, video player, tablet OC, wearable apparatus, electronic board, or display apparatus (not illustrated) and so forth.

The display apparatus may be embodied as an analogue TV, digital TV, 3D-TV, smart TV, LED TV, OLED TV, plasma TV, monitor, curved TV having a screen with a fixed curvature, flexible TV having a fixed curvature, bended TV having a screen with a fixed curvature, and/or curvature variable TV for which a curvature of a current screen may be changed by a user input received, but those skilled in the art would easily understand that there is no limitation thereto.

The terminal apparatus 100 refers to an electronic apparatus having an input pen and touch screen and configured to transmit to an external apparatus or receive from an external apparatus data (or content) through the mobile communicator 111 and sub communicator 112 that form the communicator 110.

Furthermore, the terminal apparatus 100 may include an electronic apparatus that is capable of transmitting to an external apparatus or of receiving from an external apparatus together with the external apparatus data (or content) using an interaction (for example, touch or touch gesture) input to the touch screen.

Meanwhile, the terminal apparatus 100 may have one or more touch screens. Furthermore, the terminal apparatus 100 may divide one touch screen into a plurality of areas, and display a plurality of screens each on one area.

The terminal apparatus 100 includes the controller 130, mobile communicator 111, sub communicator 112, multimedia unit 180, camera 150, GPS 155, input/outputter 160, sensor 170, storage 140, and power supply 185. Furthermore, the terminal apparatus 100 includes a touch screen 190 and touch screen controller 195.

The controller 130 may include a processor 131, a ROM 132 where a control program for controlling the terminal apparatus 100 is stored, and a RAM 133 used to store a signal or data input from outside the terminal apparatus 100, or used as an area for storing various operations performed in the terminal apparatus 100.

The controller 130 controls overall operations of the terminal apparatus 100 and controls a flow of signal between internal components 100 to 195 inside the terminal apparatus 100, and processes data.

Furthermore, the controller 130 controls power supply to internal components 100 to 195 using the power supply 185. Furthermore, in response to satisfying conditions input by the user or set by the user and stored, the controller 130 may execute an OS (Operation System) and application stored in the storage 140.

The processor 131 may include a GPU (Graphic Processing Unit, not illustrated) for processing graphics. The processor 131 may be embodied in the form of an SoC (System On Chip) that includes a core (not illustrated) and GPU (not illustrated). The processor 131 may include a single core, dual core, triple core, quad core, and a multiple cores thereof. Furthermore, the processor 131, ROM 132, and RAM 133 may be connected to one another through an internal bus.

The controller 130 may control the mobile communicator 111, sub communicator 112, multimedia 180, camera 150, GPS 155, input/outputter 160, sensor 170, storage 140, power supply 185, touch screen 190 and touch screen controller 195.

The controller 130 according to the exemplary embodiment of the present disclosure may control to store the contact object information corresponding to the caller identification information, receive the incoming call including the caller identification information and execute the connecting application corresponding to the caller identification information, and display the search result related to the contact object information on the screen of the executed connecting application on the display 120.

Furthermore, the display 120 of FIG. 2B may include the touch screen 190 of FIG. 24, and the controller 130 of FIG. 2B may store the contact object information input through the touch screen 190 in the storage 140.

The controller 130 may control the caller identification information to be displayed together with the search result displayed on the connecting application screen. For example, the controller 130 may divide the touch screen 90 into two areas, upper area and lower area, and display a screen showing information on from whom the current call is from or to whom the call is connected on the upper area, and display a screen related to the executed connecting application on the lower area. Herein, assuming the executed connecting application is a memo application, the controller 130 may display a memo application screen on the lower area, and display the search result related to the contact object information of the caller, that is information on the caller prestored and so forth on the memo application screen.

Furthermore, the controller 130 may divide the touch screen 190 into two areas, left area and right area, and display each of the caller identification information and the search result being displayed on the connecting application screen, respectively.

Furthermore, the controller 130 may display on the touch screen 190 the caller identification information, and then display the search result being displayed on the connecting application screen. In such a case, the controller 130 may divide the touch screen 190 into a plurality of areas, and may not only display each of the caller identification information and the search result being displayed on the connecting application screen, respectively, but also may display the caller identification information and the search result being displayed on the connecting application screen on the entire screen.

Furthermore, the controller 130 may control the search result corresponding to the contact object information in the connecting application to be displayed differently from other items.

Specifically, the controller 130 may display the search result corresponding to the contact object information such that it is differentiated from the caller identification information, and may display the search result corresponding to the contact object information to be differentiated based on a particular aspect of the search result, such as weather, time, and content of the search result.

For example, the controller 130 may display a plurality of memos stored corresponding to the contact object information in the memo application such that they are differentiated per date of input.

Furthermore, the controller 130 may highlight the search result corresponding to the contact object information. For example, in response to the connecting application being the calendar application, the controller 130 may display an area corresponding to the search result based on the contact object information (ex. telephone number, caller ID, email address).

Furthermore, in response to the connecting application being the memo application, the controller 130 may highlight and display the area corresponding to the search result based on the contact object information (ex. telephone number, caller ID, email address), and if the search result is below the memo screen related to the contact object information and thus needs to be scrolled down, the controller 130 may display a screen that can be scrolled such that the search result is shown on the memo screen.

The controller 130 may allow at least one of the connecting application corresponding to contact object information and the shortcut icon to be included in the contact object information.

For example, the contact object information regarding a certain caller may include items such as a caller name, telephone number, email, related group, bell sound, message receive signal, vibration pattern, and as aforementioned, in response to receiving an incoming call from the caller, the contact object information regarding the certain caller may also include information on the connecting application to be executed in an interlocked manner. Such a connecting application may include an SNS application, memo application, calendar application, and map application.

Furthermore, such a connecting application may be displayed within the contact object information by its name, but may also be displayed in the form of a shortcut icon that may represent the connecting application. That is, it may be displayed as a graphic user interface that may represent the connecting application, such as the shortcut icon.

Meanwhile, in response to there being a plurality of connecting applications corresponding to the caller identification information, the controller 130 may control each of the connecting applications to be set as a connecting application with priority or a connecting application without priority.

For example, in response to the connecting applications corresponding to the caller identification information being the memo application and calendar application, the controller 130 may set the memo application to be executed. That is, the controller 130 may set the memo application as the connecting application with priority, and set the calendar application as the connecting application without priority.

Herein, whether or not there is priority may be a reference for setting the connecting application to be executed, and by a manipulation of the user, the connecting application with priority may be changed among the plurality of connecting applications.

Furthermore, in response to there being a plurality of connecting applications corresponding to the caller identification information, the controller 130 may control the shortcut icon corresponding to the connecting application with priority to be displayed.

For example, in response to the connecting application corresponding to the caller identification information being the memo application and calendar application, assuming that the connecting application with priority is the memo application, the controller 130 may display the shortcut icon corresponding to the memo application on the contact object information.

Furthermore, in response to receiving the incoming call, the controller 130 may control the incoming call screen that includes the call identification information corresponding to the incoming call, to be displayed.

Herein, a size area of the connecting application where the search result is displayed may be smaller than a size area of the incoming call screen. Furthermore, a size area of the connecting application screen where the search result is displayed may be the same as the size area of the incoming call screen, or bigger than the incoming call screen. This may be changed according to the manipulation of the user.

Meanwhile, the controller 130 may control the incoming call screen to be changed to the connecting application screen where the search result is displayed.

That is, instead of dividing the touch screen 190 into a plurality of areas and individually displaying the incoming call screen and connecting application screen in each area, the controller 130 may display the incoming call screen on the entire screen, and then display the connecting application screen on the entire screen of the touch screen 190 while the call is being received. That is, the controller 130 may change the incoming call screen displayed on the touch screen 190 to the connecting application screen.

Furthermore, the controller 130 may control at least one of a visual feedback, audio feedback, and tactile feedback to be provided in response to the display of the search result on the connecting application.

For example, in response to the connecting application being the calendar application, the controller 130 may highlight and display the search result based on the caller identification information that is information on the schedule to meet the caller on the calendar application screen, or control the information on such schedule to be output in sound signals.

Likewise, in response to the connecting application being the memo application, the controller 130 may highlight and display the search result based on the caller identification information. That is, for example, information on contents discussed previously with the caller may be displayed on the memo application screen, or the information on such contents may be controlled to be output in sound signals.

Meanwhile, in response to a preset event occurring, the controller 130 may display a curation content based on the contact object information related to the preset event.

Specifically, in response to the preset event occurring, the controller 130 may set a medium to be shared according to a user setting, and designate link information or a URL related thereto. For example, in response to an event such as a birthday occurring, the controller 130 may automatically execute an application set based on a registered date and time and a designated person or place, or automatically display the link information or URL corresponding to a set service.

Such a preset event may be an anniversary alarm event or preset time arrival event, and for example, the anniversary may be a birthday alarm event or a wedding anniversary alarm event, and the preset time arrival event may be an event that occurs when a time set to 07:00 AM or 10:00 PM arrives.

Meanwhile, in the exemplary embodiment, the term "controller" includes the processor 131, ROM 132 and RAM 133.

Furthermore, the mobile communicator 111 may be connected to an external apparatus through a mobile communication network using one or more antenna according to a control of the controller. The mobile communicator 111 may transmit/receive a wireless signal for communication of a voice call, video call, short message service (SMS), multimedia message (MMS) and data communication with a mobile phone (not illustrated), smart phone (not illustrated), tablet PC or another type of terminal apparatus (not illustrated).

The sub communicator 112 may include at least one of a wireless LAN unit 112-1 and short distance communicator 112-2. For example, the sub communicator 112 may include one of or both of the wireless LAN unit 112-1 and short distance communicator 112-2.

The wireless LAN unit 112-1 may be connected with an AP wirelessly in a place where the AP (access point) is installed according to a control of the controller. The wireless LAN unit 112-1 supports the wireless LAN standard (IEEE802.11x) of the US Institute of Electrical and Electronics Engineers (IEEE). The short distance communicator 112-2 may perform short distance communicator between the terminal apparatus 100 and an external apparatus wirelessly, without an AP according to a control of the controller. The short distance communication may include bluetooth, bluetooth low energy, IrDA, infrared data association, Wi-Fi, UWB (Ultra Wideband) and NFC (Near Field Communication).

The terminal apparatus 100 may include at least one of the mobile communicator 111, wireless LAN unit 112-1, and short distance communicator 112-2 according to its performance. For example, the terminal apparatus 100 may include one of the mobile communicator 111, wireless LAN unit 112-1, and short distance communicator 112-2, or a combination thereof.

In the exemplary embodiment of the present disclosure, the term "communicator" includes the mobile communicator 111, and sub communicator 112.

The multimedia unit 180 may include a broadcast communicator 181, audio reproducer 182, or video reproducer 183.

Herein, the broadcast communicator 181 may receive a broadcast signal (for example, a TV broadcast signal, radio broadcast signal or data broadcast signal) and broadcast additional information (for example, EPS (Electric Program Guide) or ESG (Electric Service Guide)) being transmitted from an external broadcast station through an antenna (not illustrated) according to a control of the controller 130. Furthermore, the controller may reproduce the received broadcast signal and broadcast additional information using a touch screen, video codec (video code, not illustrated) and audio codec (audio codec, not illustrated).

Furthermore, the audio reproducer 182 may reproduce an audio source (for example, an audio file of which a file extension is mp3, wma, ogg or wav) prestored in the storage 140 of the terminal apparatus 100 or being received from outside using the audio codec according to a control of the controller 130.

According to the exemplary embodiment of the present disclosure, the audio reproducer 182 may reproduce an audio feedback (for example, output of an audio source stored in the storage) corresponding to a touch or a continuous movement of touch being detected from the touch screen 190 according to a control of the controller 130 through the audio codec.

Furthermore, the video reproducer 183 may reproduce a digital video source (for example, a file of which a file extension is mpeg, mpg, mp4, avi, mov, or mkv) prestored in storage 140 of the terminal apparatus 100 or being received from outside using the audio codec according to a control of the controller 130.

The multimedia application that can be installed in the terminal apparatus 100 may reproduce an audio source or video file using an audio codec and/or video codec.

According to the exemplary embodiment of the present disclosure, the video reproducer 183 may reproduce the visual feedback (for example, output of a video source stored in the storage) corresponding to the search result in the connecting application through the video codec according to a control of the controller 130. Those skilled in the art will easily understand that various kinds of video codecs and audio codecs are being produced and sold.

The multimedia unit 180 may include the audio reproducer 182 and video reproducer 183 excluding the broadcast communicator 181 in response to the performance and structure of the terminal apparatus 100. Furthermore, the audio reproducer 182 and video reproducer 183 of the multimedia unit 180 may be embodied to include the processor 131.

Herein, the term "video codec" in the exemplary embodiment of the present disclosure may include one or more video codecs.

Meanwhile, the camera 150 may include at least one of a first camera (151 of FIG. 22) at a front surface (100*a* of FIG. 22) and a second camera (152 of FIG. 23) at a rear surface (100*c* of FIG. 23) configured to photograph a still image or video according to a control of the controller. The camera 150 may include at least one of the first camera 151 and second camera 152. Furthermore, the first camera 151 or second camera 152 may include a subsidiary light source (for example, flash 153) that provides the amount of light necessary for taking a photograph.

The controller 130 may photograph a 3-dimensional still image or 3-dimensional video using the first camera 151 at the front surface and an additional camera (for example, a third camera, not illustrated) disposed adjacent to the first camera 151 (for example, the distance between the first camera and additional camera being more than 300 mm and less than 80 mm).

Or, the controller 130 may photograph a 3-dimensional still image or 3-dimensional video using the second camera 152 at the rear surface and an additional camera (for example, third camera, not illustrated) disposed adjacent to the second camera 152 (for example, the distance between the second camera and additional camera being more than 30 mm and less than 80 mm).

Furthermore, the first and second camera 151, 152 may take a wide angle, telephoto and closeup photograph using an additional lens (not illustrated) that is detachable using an additional adapter (not illustrated).

Furthermore, the controller 130 may identify a user through face recognition or iris recognition using the first and second camera 151, 152, and may perform an eyeline tracking function through a movement of a pupil or iris.

The GPS 155 regularly receives information (for example, exact location information and time information of a GPS satellite receivable in the terminal apparatus 100) from a plurality of GPS satellites (not illustrated) on the Earth's orbit. The terminal apparatus 100 may know a location, rate of movement or time of movement of the terminal apparatus 100 using the information received from the plurality of GPS satellites.

The inputter/outputter 160 may include at least one of a button 161, microphone 162, speaker 163, vibration motor 164, connector 165, keypad 166, and input pen 167.

Referring to FIGS. 22 and 23, the button 161 includes a home button 161*a*, menu button 161*b*, and back button 161*c* disposed on a lower part of the front surface 100*a*. Furthermore, the button 161 may include at least one volume button 161*e* and a power/lock button 161*d* at a side surface 100*b*. Furthermore, the button 161 of the terminal apparatus 100 may include only the home button 161*a*. The button 161 of the terminal apparatus 100 may be embodied as not only a physical button but also a touch button in a bezel outside the touch screen 190. Furthermore, the button 161 of the terminal apparatus 100 may be displayed on the touch screen 190 in the form of an image or icon.

The microphone 162 receives a voice or sound from outside and generates an electrical signal according to a control of the controller 130. The electrical signal generated in the microphone 162 may be converted in the audio codec and stored in the storage 140 or output through the speaker 163. One or more microphones 162 may be disposed on a front surface 100*a*, side surface 10*b*, and rear surface 100*c* of the terminal apparatus 100. Furthermore, the one or more microphones 162 may be disposed on only the side surface 100*b* of the terminal apparatus 100.

The speaker 163 may output a sound corresponding to various signals (for example, wireless signal, broadcast signal, audio source, video file or photographing) of the mobile communicator 111, sub communicator 112, multimedia unit 180 or camera 150 to outside the terminal apparatus 100 using the audio codec according to a control of the controller 163.

The speaker 163 may output a sound (for example, touch manipulation sound or photograph button manipulation sound corresponding to an input of a telephone number) corresponding to a function that the terminal apparatus 100 performs. One or more speakers 163 may be disposed on the front surface 100*a*, side surface 100*b* and rear surface 100*c* of the terminal apparatus. Referring to FIGS. 22 and 23, a plurality of speakers 163*a*, 163*b* may be disposed on the front surface 100*a* of the terminal apparatus 100. Furthermore, each of the speakers 163a, 163b may be disposed on each of the front surface 100a and rear surface 100c of the terminal apparatus 100. One speaker 163a may be disposed on the front surface 100a of the terminal apparatus 100, and a plurality of speakers 163b (or additional speaker, not illustrated) may be disposed on the rear surface 100c of the terminal apparatus 100. Furthermore, the speaker 163a, 163b may be disposed on the side surface 100b. The terminal apparatus 100 where an additional speaker (not illustrated) is disposed on the side surface 100b may provide the user with a sound effect different from the terminal apparatus (not illustrated) where a speaker is disposed on the front surface 100a and rear surface 100c.

Furthermore, according to an exemplary embodiment of the present disclosure, the speaker 163 may output an audio feedback in response to the search result in the connecting application according to a control of the controller 130.

The vibration motor 164 may convert an electrical signal into a mechanical vibration according to a control of the controller 130. The vibration motor 164 may include a linear vibration motor, bar type vibration motor, coin type vibration motor or piezo-electric element vibration motor. For example, in response to receiving a request for a voice call from another terminal apparatus (not illustrated), the vibration motor 164 of the terminal apparatus 100 in a vibration mode may operate according a control of the controller 130. One or more vibration motors 164 may be disposed in the terminal apparatus 100. Furthermore, the vibration motor 164 may make the entire terminal apparatus 100 vibrate or only a portion of the terminal apparatus 100 vibrate.

Furthermore, according to the exemplary embodiment, the vibration motor 164 may output a tactile feedback in response to the search result in the connecting application according to a control of the controller 130. Furthermore, the vibration motor 165 may provide various tactile feedbacks (for example, intensity of vibration and duration of vibration) prestored or received from an external apparatus based on a control command of the controller 130.

The connector 165 may be used as an interface for connecting the terminal apparatus 100 and external apparatus (not illustrated) or power source (not illustrated). According to the control of the controller 130, the terminal apparatus 100 may transmit data stored in the storage 140 or receive data from an external apparatus (not illustrated) through a wired cable connected to the connector 165. The terminal apparatus 100 may receive power or charge a battery (not illustrated) from a power source (not illustrated) through the wired cable connected to the connector 165. Furthermore, the terminal apparatus 100 may be connected to an external accessory (for example, keyboard dock, not illustrated) through the connector 165.

The keypad 166 may receive a key input from the user to control the terminal apparatus 100. The keypad 166 includes a physical keypad (not illustrated) formed on the front surface 100a, a virtual keypad (not illustrated) displayed on the touch screen 190, and/or a physical keypad (not illustrated) that may be connected wirelessly or wiredly. Those skilled in the art would easily understand that the physical keypad (not illustrated) formed on the front surface 100a of the terminal apparatus 100 may not be included according to the performance and structure of the terminal apparatus 100.

The input pen 167 may touch or select an object (for example, menu, text, image, video, figure, icon and shortcut icon) being displayed on a screen (for example, memo screen, note pate screen, calendar screen) of the home screen 191, or handwriting/drawing application of the touch screen 190 of the terminal apparatus 100. The input pen 167 may touch or select a content (for example, text file, image file, audio file, video file or web page) being displayed on a screen (for example, memo screen, note screen, calendar screen) of a touch screen or handwriting/drawing application of the terminal apparatus 100. Furthermore, the input pen 167 may handwrite or draw (paint or sketch) on a screen (for example, canvas screen) of a drawing application or handwriting application (for example, memo screen) being displayed on the touch screen 190 of the terminal apparatus 100.

The input pen 167 may input a character using a virtual keypad being displayed or by touching a touch screen of a capacitive type, resistive overlay type, or electromagnetic resonance (EMR) type. The input pen 167 may include a stylus pen or a haptic pen (not illustrated) where a vibration element embedded therein (for example, an actuator or vibration motor) vibrates. Furthermore, the input pen 167 may operate a vibration device (for example, vibrate) in response to control information being received from the terminal apparatus 100 and also sensing information detected from a sensor (for example, accelerator sensor, not illustrated) embedded in the input pen 167.

In response to the input pen 167 being withdrawn from an insertion hole (not illustrated), the controller 130 may execute the set handwriting/drawing application and display the screen of the handwriting/drawing application on the touch screen 190.

Furthermore, the input pen 167 may include the user's finger (for example, including thumb). For example, in the application being displayed on the capacitive type touch screen or resistive overlay type touch screen, handwriting or drawing may be input by the user's finger.

In response to the handwriting or drawing being input by the user's finger in the application being displayed on the capacitive type touch screen or resistive overlay type touch screen, the controller may detect a touch of the fingers including the thumb using the touch screen 190 and touch screen controller 195.

Those skilled in the art would easily understand that the shape or structure of the insertion hole (not illustrated) and input pen 167 of the terminal apparatus 100 may change according to the performance or structure of the terminal apparatus 100.

The sensor 170 includes at least one sensor configured to detect a state of the terminal apparatus 100. For example, the sensor 170 may include an illumination sensor 172 configured to detect an amount of light surrounding the terminal apparatus 100, a proximity sensor 171 configured to whether or not the user is near the terminal apparatus 100, and a gyro sensor 173 configured to detect a direction using rotational inertia of the terminal apparatus 100. Furthermore, the sensor 170 may include an acceleration sensor (not illustrated) configured to detect an acceleration of three axes (x axis, y axis, and z axis) being applied to the terminal apparatus 100, a gravity sensor configured to detect a direction of gravity, or an altimeter configured to measure an atmospheric pressure to detect an altitude.

The sensor 170 may measure a motional acceleration and gravitational acceleration of the terminal apparatus 100, respectively. When the terminal apparatus 100 does not move, the sensor 170 may measure only the gravitational acceleration. For example, when the front surface of the terminal apparatus 100 is facing upwards, the gravitational acceleration may have a positive (+) direction, and when the rear surface of the terminal apparatus 100 is facing upwards, the gravitational acceleration may have a negative (−) direction. Furthermore, the sensor 170 may further include a fingerprint sensor (not illustrated) configured to detect a fingerprint of the user, or a heartbeat sensor (not illustrated) configured to detect a heart rate of the user.

At least one sensor included in the sensor 170 detects a state of the terminal apparatus 100, generates an electrical signal corresponding to the detection and transmits the electrical signal to the controller. Those skilled in the art would easily understand that the sensor included in the sensor 170 may be added or removed according to the performance of the terminal apparatus 100.

Furthermore, the storage 140 may store a signal or data being input/output correspondingly to operation of a mobile communicator 111, sub communicator 112, multimedia unit 180, camera 150, GPS 155, input/outputter 160, sensor 170, and touch screen 190 according to a control of the controller 130. The storage 140 may store a control program for controlling the terminal apparatus 100 or controller 130, a GUI (graphical user interface) related to an application provided from a manufacturer or downloaded from outside, images for providing the GUI, user information, documents, databases or related data.

The storage 140 according to the exemplary embodiment of the present disclosure may store the incoming call being received from the mobile communicator 111 or caller identification information included in the incoming call.

Furthermore, the storage 140 may store the contact object information corresponding to the caller identification information. The information on the contact object information may include a photograph and name corresponding to the contact object information, at least one shortcut icon corresponding to the connecting application, name of the connecting application, path of the connecting application, address, email address, shortcut icon corresponding to the email address, telephone number, shortcut icon corresponding to the telephone number, identifier (ID) of the contact object information, telephone number group, bell sound, message receive sound, or birthday etc.

The storage 140 may store information related to a first touch to fifth touch, a location of a first to fifth touch, and first touch location information to fifth touch location information. Furthermore, the storage 140 may store information related to a first hovering to fifth hovering, a location of a first to fifth hovering, and first hovering information to fifth touch hovering information.

Furthermore, the storage 140 may store visual feedback (for example, video source etc.) perceivable by the user. The visual feedback may be output to the touch screen 190 based on the display of the search result in the connecting application. The storage 140 may also store audio feedback (for example, sound source etc.) perceivable by the user that can be output in the speaker 163, and a tactile feedback (for example, haptic pattern etc.) perceivable by the user, which can be output in the vibration motor 164.

Furthermore, the storage 140 may store the feedback provision time (for example, 500 msec) of the feedback being provided to the user.

Meanwhile, the storage 140 may include a communication module (not illustrated) for receiving the incoming call that includes caller identification information, an application execution module (not illustrated) for executing the connecting application corresponding to the caller identification information, and a display module (not illustrated) for displaying the search result related to the contact object information on the screen of the executed connecting application, and the controller 130 may perform various functions using various software modules stored in the storage 140.

In an exemplary embodiment of the present disclosure, the term "storage" may include the storage 140, ROM 132 inside the controller 130, RAM 133 or a memory card (not illustrated) (for example, micro SD card, memory stick) being mounted in the terminal apparatus 100. The storage may include a nonvolatile memory, volatile memory, hard disc drive (HDD) or solid state drive (SSD).

The power supply 185 may supply power to at least one battery (not illustrated) of the components disposed inside the terminal apparatus 100 according to a control of the controller 130.

Herein, the at least one battery (not illustrated) may be disposed between the touch screen 190 disposed in the front surface 100a and the rear surface 100c. The power supply 185 may supply power being input from an external power source (not illustrated) to the terminal apparatus 100 through a wired cable (not illustrated) connected to the connector 165 according to a control of the controller 130. Furthermore, the power supply 185 may be wirelessly charged (for example, magnetic resonance type, electromagnetic type, or magnetic induction type) according to control of the controller.

The touch screen 190 includes a touch panel (not illustrated) that receives a touch input and a display panel (not illustrated) for displaying a screen. The touch screen 190 may provide to the user a GUI (Graphical User Interface) corresponding to various services (for example, voice call, video call, data transmission, broadcast reception, photographing, video viewing, or application execution). The touch screen 190 may transmit an analogue signal corresponding to a single touch or multi touch being input through the GUI or home screen 191 to the touch screen controller 195. The touch screen 190 may receive an input of the single touch or multi touch through the user's body part (for example, fingers including the thumb) or an input pen 167.

The display panel (not illustrated) has a plurality of pixels and displays an image via the pixels. For example, display panels (not illustrated) include a liquid crystal device (LCD), organic light emitting diode (organic LED), LED and the like. The display panel (not illustrated) may display a plurality of objects and various images according to various operation states, application or service execution of the terminal apparatus 100.

In the exemplary embodiment of the present disclosure, the touch is not limited to a touch by a user's body part or contact of the input pen 167, but also includes a noncontact. For example, the noncontact may include a hovering where the distance being the touch screen 190 and the user's body part or input pen 167 is 50 mm or less. Those skilled in the art would easily understand that the noncontact distance detectable in the touch screen 190 may be changed according to the performance or structure of the terminal apparatus 100.

The touch screen 190 may be embodied in for example, a resistive type, capacitive type, infrared type or acoustic wave type touch screen.

The touch screen 190 may include an electromagnetic resonance (EMR) type touch screen. The electromagnetic resonance type touch screen further includes an additional electromagnetic resonance type touch panel (not illustrated) for receiving an input of an input pen (not illustrated) having an electromagnetic resonance type resonance circuit that resonates in a loop coil.

Meanwhile, the touch screen controller 195 converts an analogue signal corresponding to the single touch or multi touch received from the touch screen 190 into a digital signal and transmits the digital signal to the controller 130. The controller may compute an X and Y coordinate corresponding to the touch location on the touch screen 190 using the digital signal received from the touch screen controller 195.

The controller 130 may control the touch screen 190 using the digital signal received from the touch screen controller 195. For example, the controller may display a shortcut icon (193a of FIG. 22) displayed on the touch screen 190 to be differentiated from other shortcut icons (for example, 193b to 193h) or execute an application (for example, telephone) corresponding to the selected shortcut icon (193a of FIG. 22) and display the application screen on the touch screen 190 in response to the touch input.

The touch screen controller 195 may be embodied as one or a plurality of touch screen controllers 195. The touch screen controller 195 may be included in the controller correspondingly to the performance or structure of the terminal apparatus 100.

The touch screen controller 195 may convert an analogue signal corresponding to a touch being received in the electromagnetic resonance type touch screen into a digital signal separately from the analogue signal corresponding to the single touch or multi touch received from the touch screen 190, and transmit the digital signal to the controller 130. The controller 13 may compute an X and Y coordinate corresponding to the touch location on the electromagnetic resonance type touch screen using the digital signal received from the touch screen controller 195. Furthermore, in the case of the electromagnetic resonance type touch screen, an electromagnetic resonance type touch screen controller (not illustrated) may be used.

Meanwhile, the terminal apparatus 100 illustrated in FIGS. 22 and 24 has only one touch screen. However, the terminal apparatus 100 may have a plurality of touch screens. Each of the touch screens may be disposed in a housing, and may be mutually connected by a hinge or a plurality of touch screens may be disposed in one flexible housing. Each of the plurality of touch screens may be configured to include a display panel and touch panel as illustrated in FIG. 24.

Those skilled in the art would easily understand that at least one component may be added or removed from the terminal apparatus 100 in accordance with the performance of the terminal apparatus 100.

Figure 25:
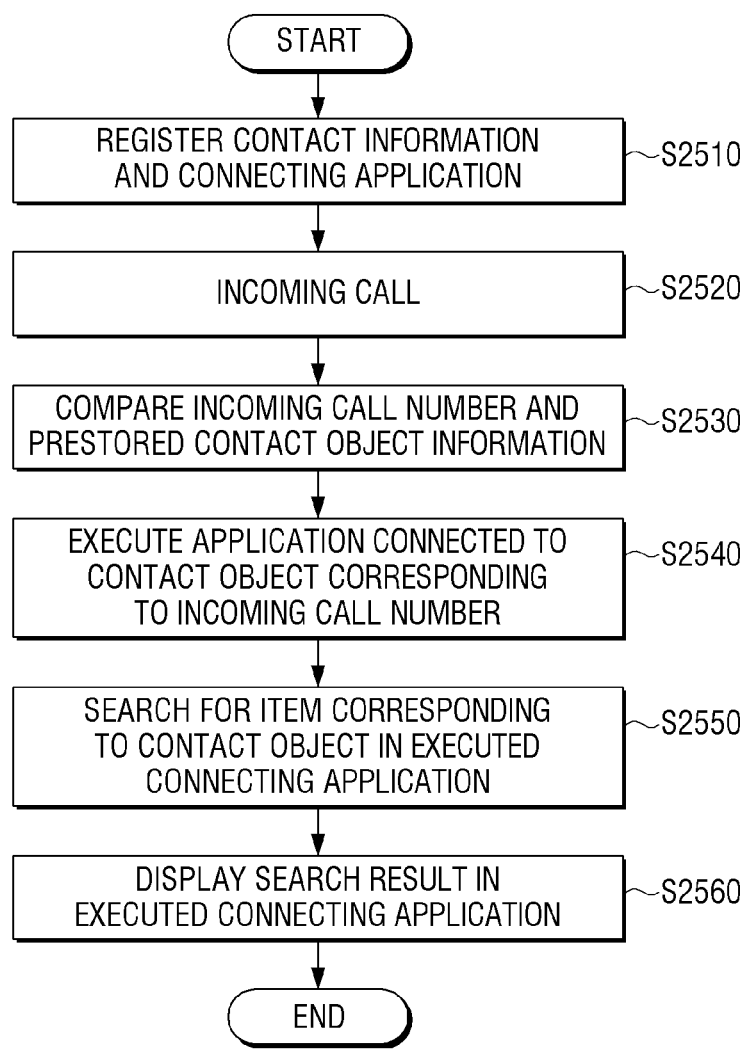
FIG. 25 is a schematic flowchart illustrating a method for displaying content of a terminal apparatus according to an exemplary embodiment.

FIG. 25 is a schematic flowchart illustrating a method for displaying content of a terminal apparatus according to an exemplary embodiment.

Figure 26:
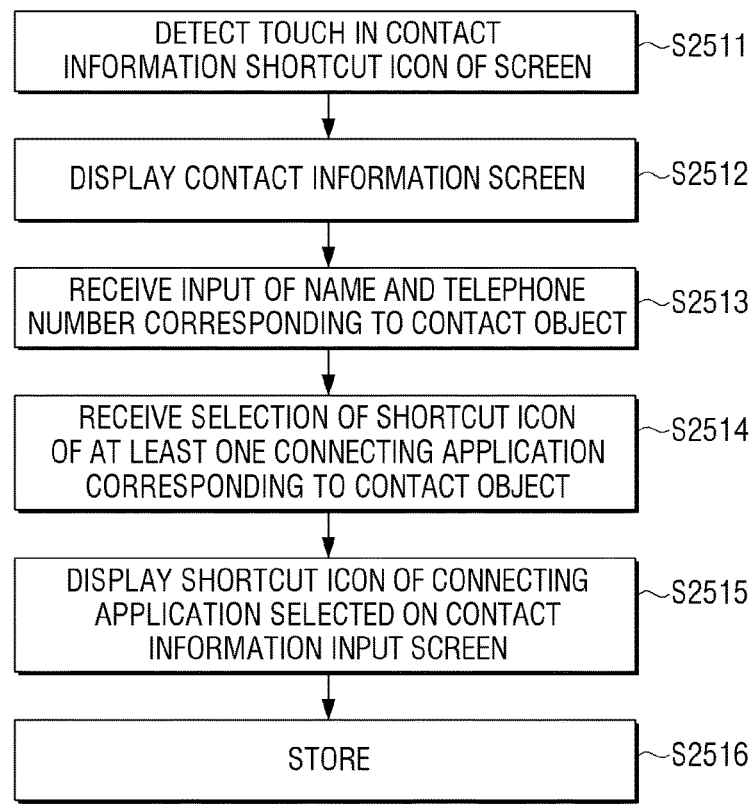
FIG. 26 is a flowchart illustrating in detail a process performed at S2510 of FIG. 25 according to an exemplary embodiment.

FIG. 26 is a flowchart illustrating in detail a process performed at S2510 of FIG. 25 according to an exemplary embodiment.

Figure 27:
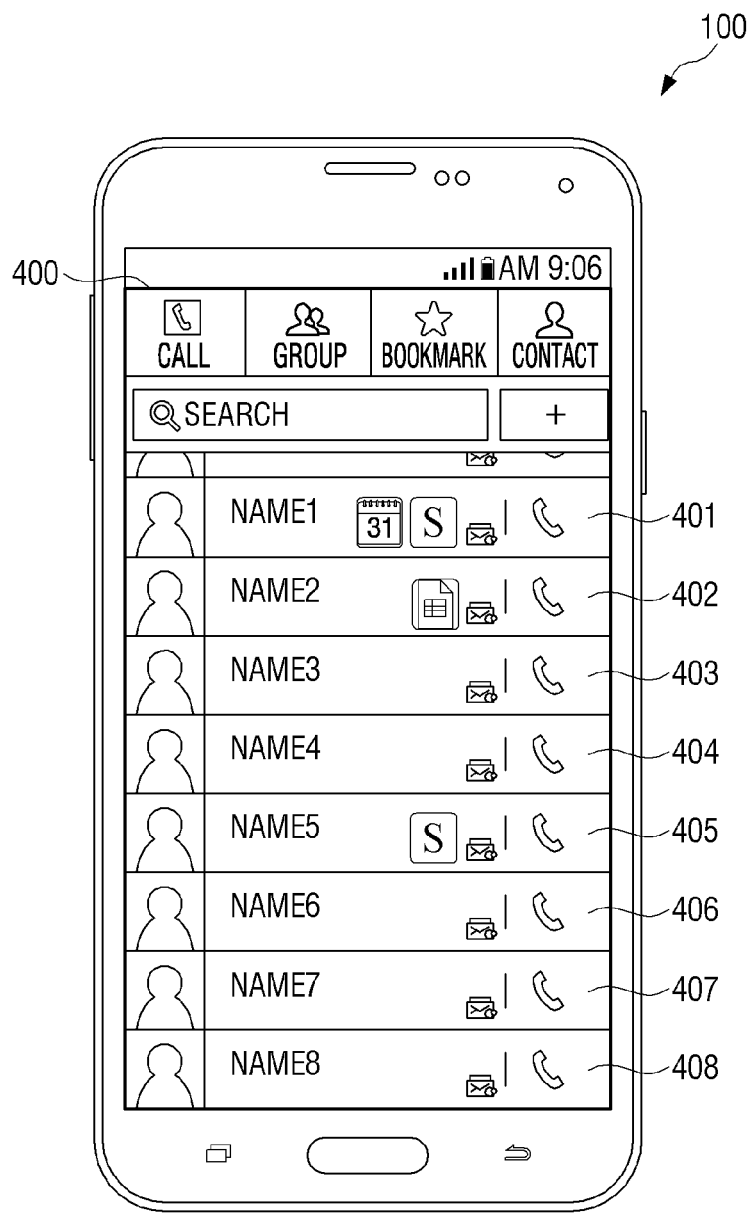
FIGS. 27 to 29 are views of an example of a screen of a terminal apparatus according to an exemplary embodiment.
Figure 28:
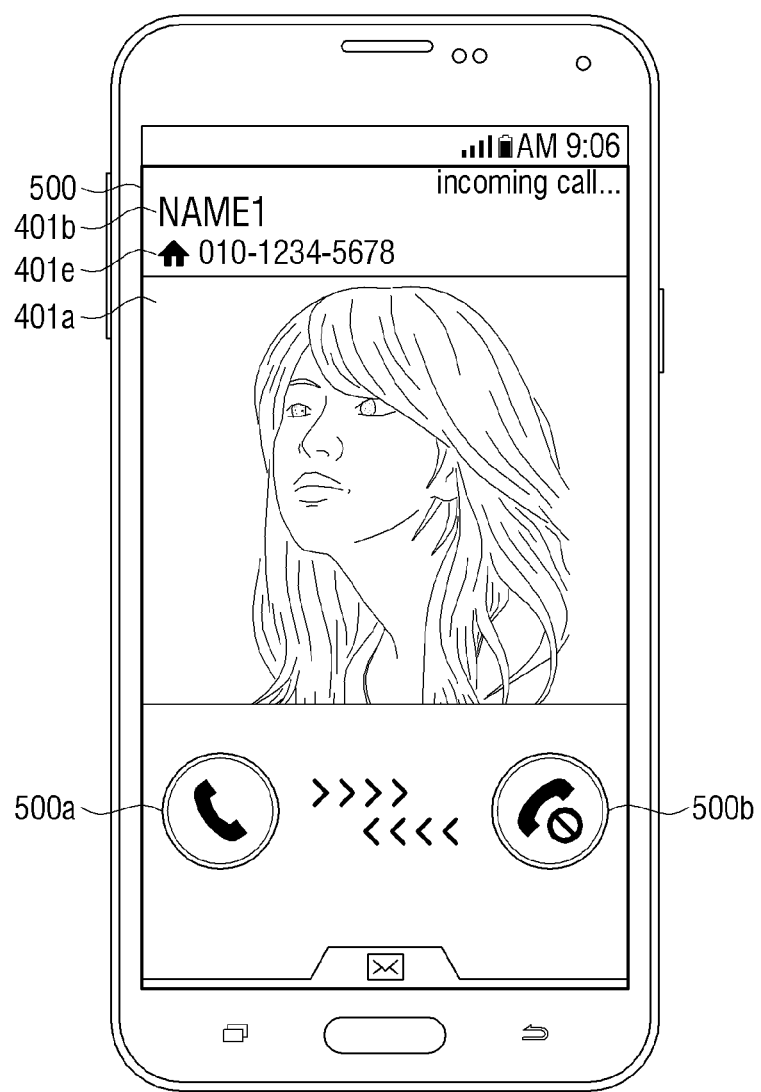
Figure 29:
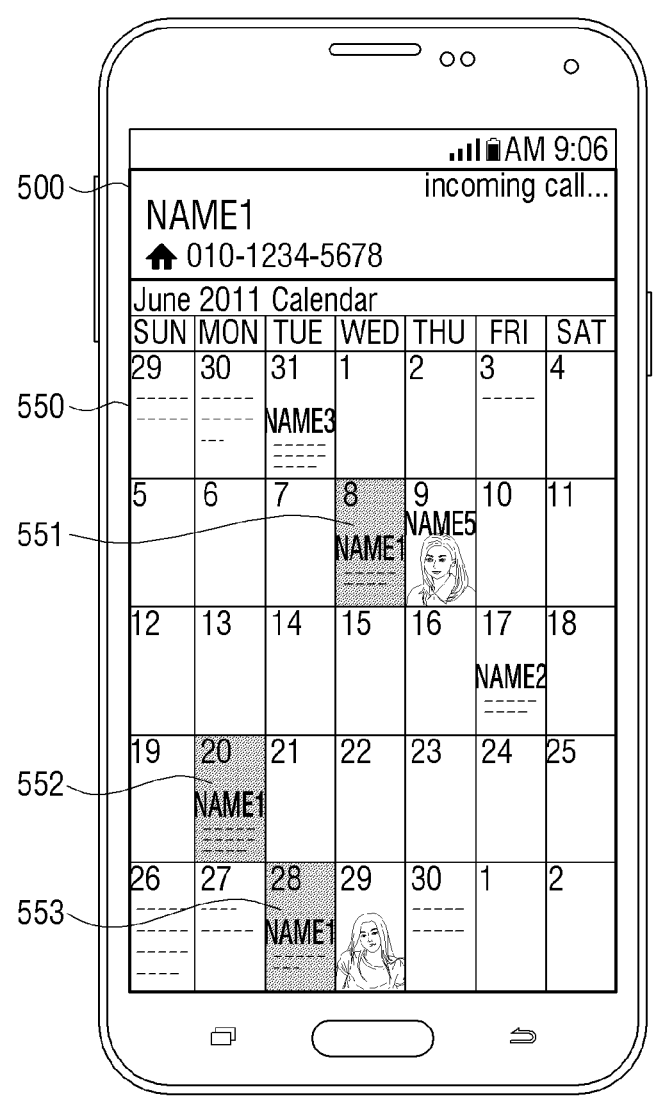

FIGS. 27 to 29 are views of an example of a screen of a terminal apparatus according to an exemplary embodiment.

FIGS. 32 to 38 are views illustrating an example of registering an application in contact information according to an exemplary embodiment.

At the operation (S2510) of FIG. 25, information on a telephone number and a connecting application is registered.

Referring to FIG. 27, information on the telephone number and registered connecting application corresponding to an object of the contact information is displayed.

Registering the information on the telephone number and connecting application corresponding to the operation (S310) of FIG. 25 will be explained in detail with reference to FIG. 26 and FIGS. 32 to 38.

At the operation (S2511) of FIG. 26, at a shortcut icon corresponding to the telephone number on the screen, a touch is detected.

Figure 32:
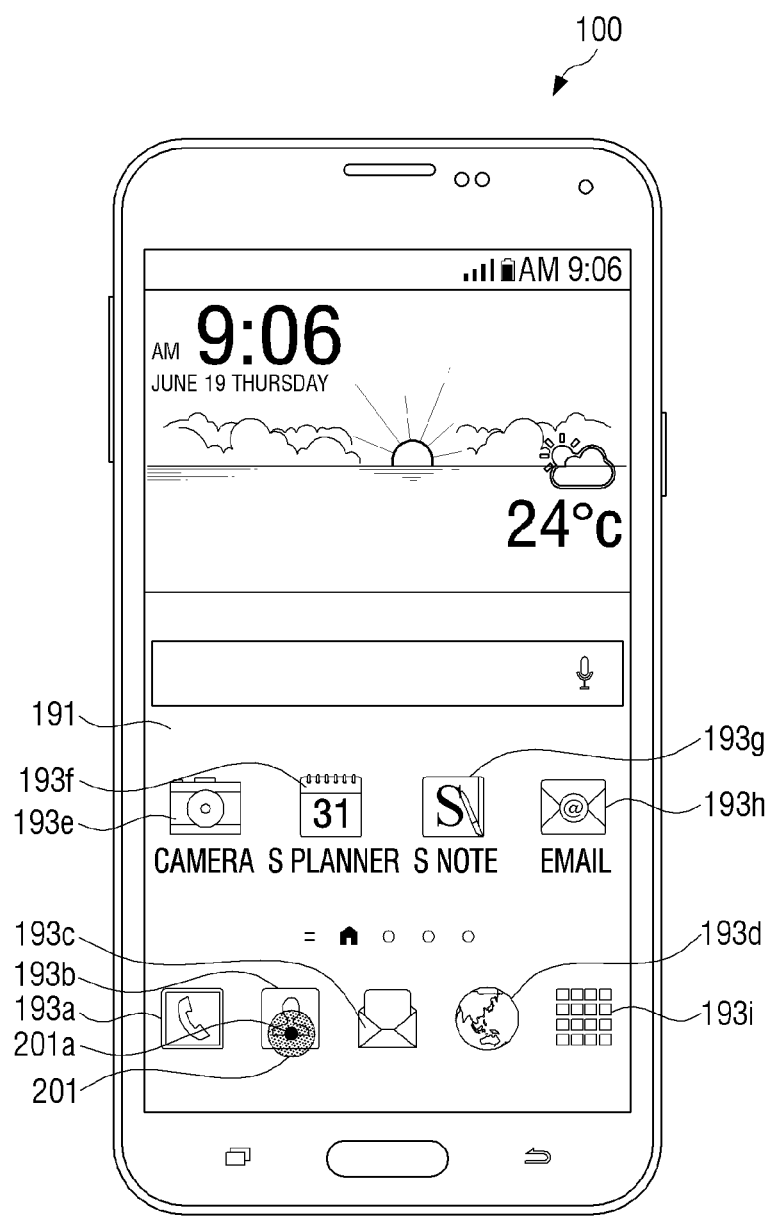
FIGS. 32 to 38 are views illustrating an example of registering an application with contact information according to an exemplary embodiment.

Referring to FIG. 32, at a shortcut icon corresponding to the telephone number on the screen, a touch is detected.

Referring to FIG. 32, a shortcut icon 193a to 193i corresponding to various applications are displayed on the screen. At the shortcut icon 193b corresponding to the telephone number, a first touch 201 is input by the user. The controller may detect the first touch 201 using the touch screen 190 and touch screen controller 195. The touch screen controller 130 may compute a first touch location (201a, for example, X1 and Y1 coordinate) corresponding to a first touch 201 using the electrical signal received from the touch screen controller 195.

The controller 130 may store the first touch location information corresponding to the first touch location 201a in the storage. The first touch location information being stored may include a touch identifier (ID), touch location, touch detection time, or touch information (for example, touch pressure, touch direction, touch duration) for history management.

Furthermore, the controller 130 may detect the first hovering (not illustrated) using the touch screen controller 195 and the touch screen 190. The controller may compute the first hovering location (not illustrated, for example, X11 and Y11 coordinate) corresponding to the first hovering using the electrical signal being received from the touch screen controller 195.

The controller 130 may store the first hovering location information corresponding to the first hovering location in the storage. The first hovering location information being stored may include the hovering detection location, hovering detection time, or hovering information (for example, hovering height (h), hovering direction, hovering duration).

The touch of the input pen 167 is a single point touch. The controller 130 may detect the touch of the input pen 167 by a single point touch. Furthermore, in the case of the electromagnetic resonance type input pen (not illustrated), the controller may determine the touch of the input pen through the second touch panel (not illustrated). In the case of an input pen (for example, capacitive type) that is not an electromagnetic resonance type, the controller may determine the touch of the input pen based on whether or not there is a single point touch.

At the operation (S2512) of FIG. 26, the contact information screen is displayed.

Figure 33:
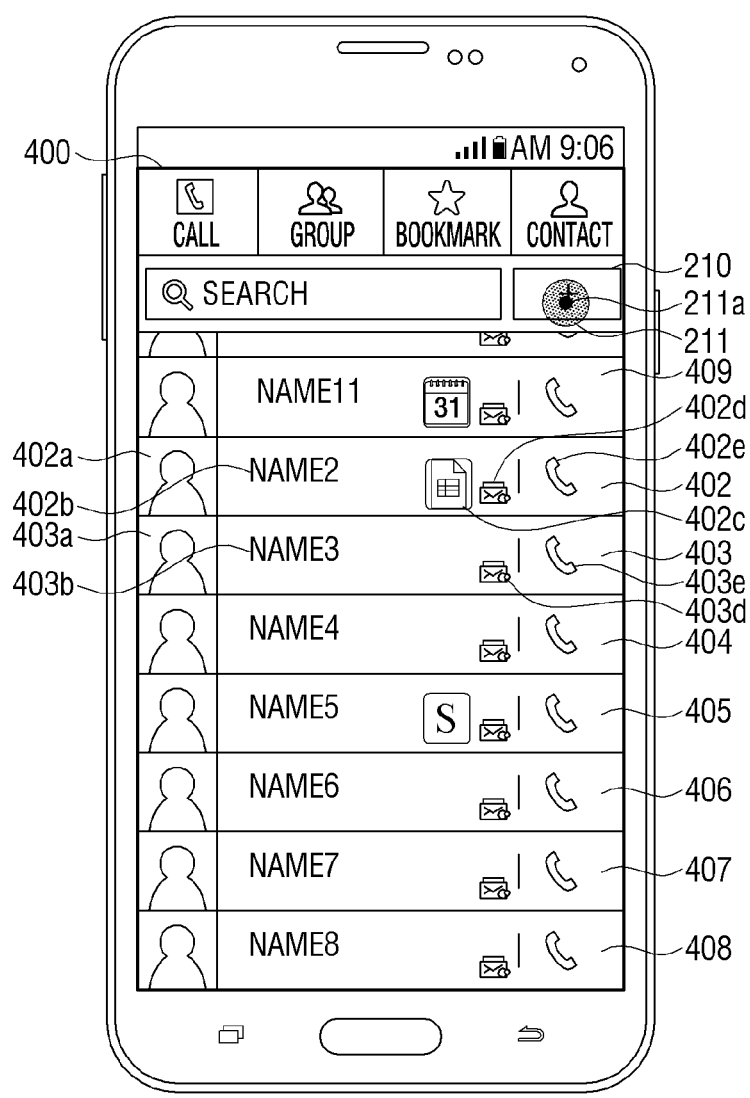

Referring to FIG. 33, the controller displays the contact information screen 400 that includes a list of contact objects in response to the first touch 201. The list of contact objects includes each of the registered contact objects 402 to 409. A portion of the contact information (for example, contact object information) corresponding to the contact objects 402 to 409 may be displayed on an area corresponding to the contact objects. The area corresponding to the contact objects refers to an area where the contact information corresponding to the contact objects is displayed, each contact object is displayed distinguishably. For example, a contact object 403 that is different from another contact object 403 may be differentiated by its corresponding area.

The contact information (for example, contact object information) corresponding to the contact object may include some of the caller identification information (for example, telephone number etc). The contact object information may be synchronized with some of the caller identification information (for example, telephone number) and be generated by the user's input.

An example of the contact information (for example, contact object information) corresponding to the contact objects 402 to 409 will be explained using the contact object 402. The contact information may include items corresponding to the contact object 402—for example, photograph 402a, name 402b, at least one shortcut icon 402c corresponding to the connecting application, name of the connecting application, path of the connecting application, address (not illustrated), email address, shortcut icon 402d corresponding to the email address, telephone number, shortcut icon 402e corresponding to the telephone number, contact information group (not illustrated), bell sound (not illustrated), message receive sound (not illustrated), contact object identifier (ID, for example, that may be logged in or logged out to an additional application that supports voice call video call that uses a data network) or birthday etc. The controller may identify the caller using at least one item included in the contact object information. For example, in the case of wired/wireless communication, the controller may identify the caller using the telephone number. In the case of data communication, the controller may identify the caller using the email address or identifier of the contact object.

In the case where there are a plurality of connecting applications corresponding to the contact object, the connecting application with priority may be designated. For example, the controller may set the connecting application selected preferentially by the user as the connecting application with priority. Furthermore, in the case where a plurality of connecting applications are selected by the user, the controller 130 may change the connecting application with priority and connecting application without priority at the user's selection.

The controller 130 may display the shortcut icon corresponding to the connecting application with priority on the contact information screen 400. For example, the controller may display the shortcut icon corresponding to the connecting application with priority such that it is displayed a specific distance left of (or above) the shortcut icon of the connecting application without priority. Furthermore, the controller may display the shortcut icon corresponding to the connecting application with priority on the contact information input screen 410.

There may be one or a plurality of items (for example, 402a to 402e) included in the contact information corresponding the contact object. For example, the contact information corresponding to the contact object may include a plurality of telephone numbers, email addresses or connecting applications.

In an exemplary embodiment of the present disclosure, the contact information corresponding to the contact object may be referred to as contact object information.

At the operation (S2513) of FIG. 26, an input of the name or telephone number corresponding to the contact object is input.

Referring to FIG. 33, in the icon 210 corresponding to adding the contact object, a second touch 211 is input by the user. The controller may detect the second touch 211 using the touch screen 190 and touch screen controller 195. The controller 130 may compute the second touch location 211a (for example, X2 and Y2 coordinate) corresponding to the second touch 211 using the electrical signal being received from the touch screen controller 195.

The controller 130 may store the second touch location information corresponding to the second touch location 211a in the storage. The first touch location information being stored may include a touch identifier ID, touch location, touch detection time, or touch information (for example, touch input, touch direction, and touch duration etc.) for history management.

At the operation (S2513) of FIG. 26, the second hovering detection is substantially the same as the first hovering detection of the operation (S2511) of FIG. 26, and thus repeated explanation is omitted.

Figure 34:
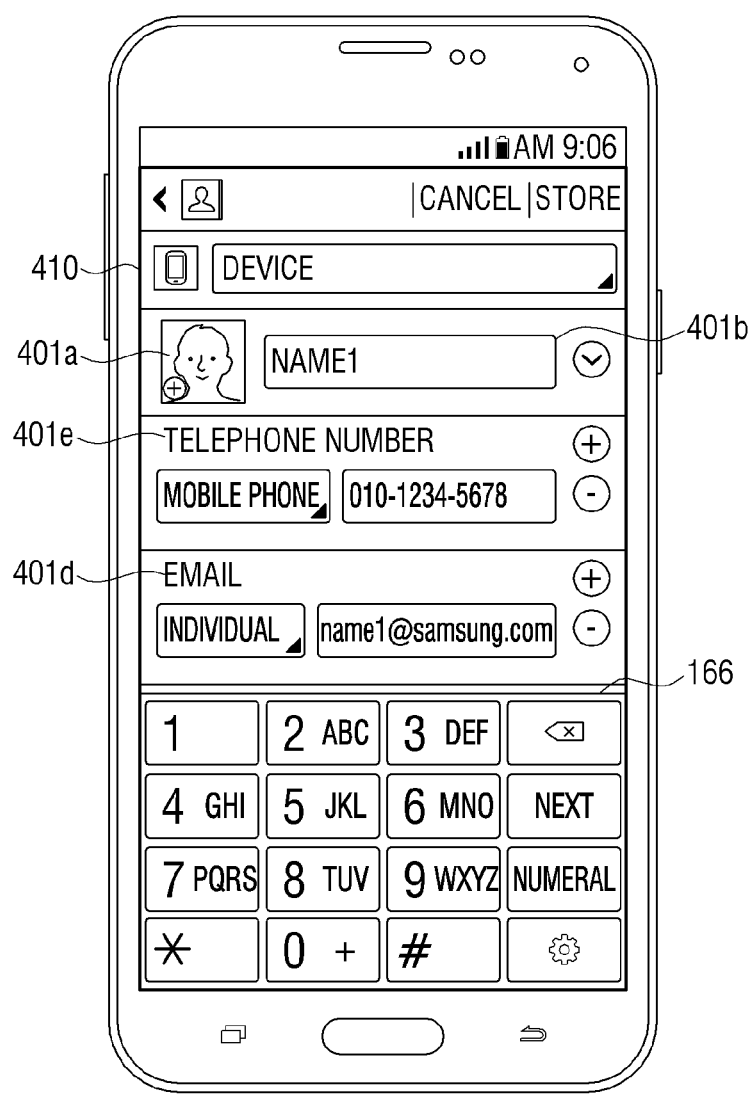

Referring to FIG. 34, the controller 130 displays the contact information input screen 410 corresponding to the contact object (for example, 401) to be associated with the second touch 211. The controller 130 receives the user's input in each contact information item (for example, photograph 401a, name 401b, telephone number 401e, or email address 401d etc.) being displayed on the contact information input screen 410. The controller 130 may receive the user's input corresponding to another contact information item not illustrated. The controller 130 may receive the user's input corresponding to each contact information item through the keypad 166.

At the operation (S2514) of FIG. 26, a selection of the shortcut icon corresponding to at least one application connected to the contact object is received.

Figure 35:
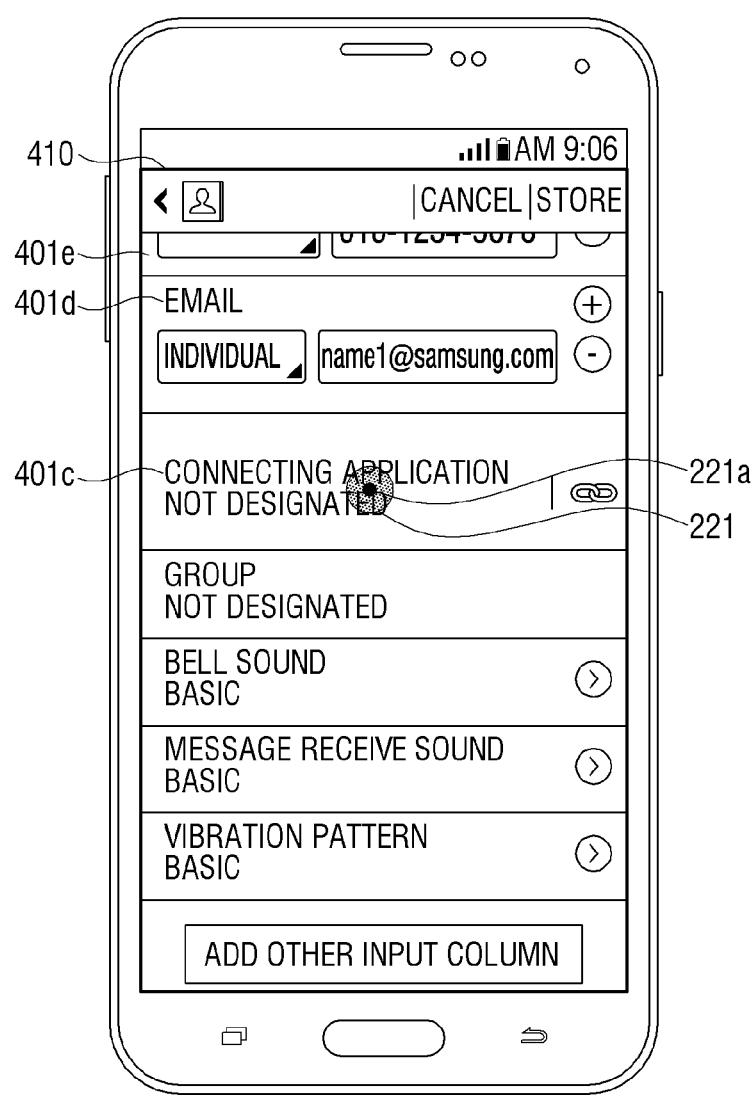
Figure 36:
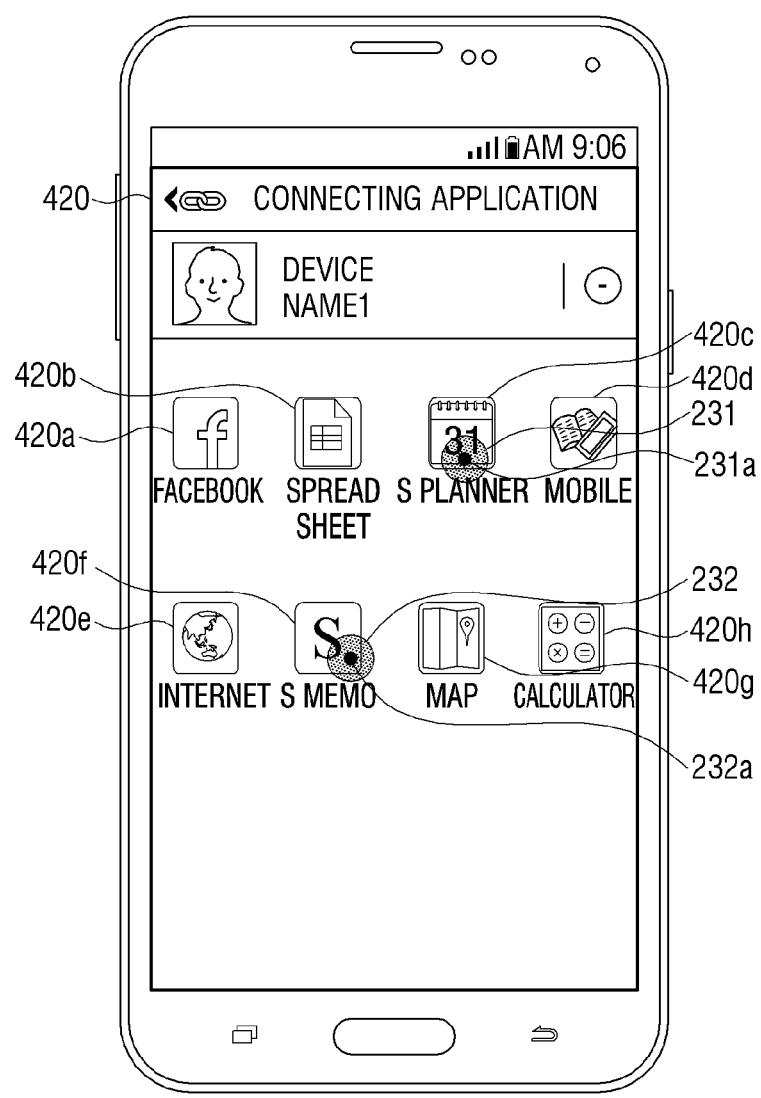

Referring to FIGS. 35 and 36, the selection of the shortcut icon corresponding to at least one connecting application is received by the user correspondingly to the contact object.

The connecting application 401c disposed on the bottom end of the contact information input screen may be displayed by the user's touch scroll regarding the contact information input screen 410. In the connecting application 401c, the third touch 221 is input by the user. The controller 130 may detect the third touch 221 using the touch screen 190 and touch screen controller 195. The controller 130 may compute the third touch location 221a (for example, X3 and Y3 coordinate) corresponding to the third touch 221 using the electrical signal received from the touch screen controller 195.

The controller 130 may store the third touch location information corresponding to the third touch location 221a in the storage. The first touch location information being stored may include a touch identifier ID, touch location, touch detection time, or touch information (for example, touch pressure, touch direction, touch duration) for history management.

The third hovering detection at the operation (S2514) of FIG. 26 is substantially the same as the first hovering detection at the operation (S2511) of FIG. 26, and thus repeated explanation is omitted.

The controller 130 may display the connecting application selection screen 420 associated with the third touch 221. Furthermore, the controller 130 may display the connecting application selection screen 420 such that it overlaps on top of the contact information input screen 410.

The connecting application selection screen 420 may have a specific transparency (% of transparency may be changed by setting). The controller 130 may display the connecting application selection screen 420 having a specific transparency such that is overlaps on top of the contact information input screen 410. Furthermore, a size area of the overlapping connecting application selection screen 420 may be smaller than a size area of the contact information input screen 410.

On the connecting application selection screen 420, shortcut icons 420a to 420h corresponding to the application connectable to the contact object are displayed. The application connectable to the contact object may, for example, include an application that is already installed in the terminal apparatus 100 or that may be downloaded through the communicator 111 from an external source.

On the connecting application selection screen 420, the fourth touch 231 of selecting by the user the shortcut icon 420c of the connecting application (for example, S planner)

corresponding to the contact object 401 is input. The controller 130 may detect the fourth touch 231 using the touch screen 190 and touch screen controller 195. The controller may compute the fourth touch location 231 (for example, X4 and Y4 coordinate) corresponding to the fourth touch 231 using the electrical signal being received from the touch screen controller 195.

Furthermore, the fourth touch may be a plurality of touches being repeated. For example, in the case where the shortcut icon 420c of the S planner is selected by the first of the plurality of fourth touches 231, the controller may next display an additional popup (not illustrated) for receiving the selection of the connecting application. The additional popup (not illustrated) may include "yes" or "no" for selecting the second connecting application. In response to the "yes" for selecting the second connecting application being selected in the additional popup (not illustrated), the second of the plurality of fourth touches 232 for selecting the shortcut icon 420f of the second connecting application (for example, S memo) corresponding to the contact object 401 may be input by the user in the connecting application selection screen 420.

The controller 130 may detect the fourth touches 231, 232 which represent multiple touches using the touch screen 190 and touch screen controller 195. The controller 130 may compute the fourth touch location 231a, 232a (for example, X4-1, X4-2 and Y4-1, Y4-2 coordinate) corresponding to the fourth touch 231, 232 using the electrical signal received from the touch screen controller 195.

Furthermore, those skilled in the art would easily understand that the fourth touch may be input by the user for selecting the shortcut icon of the connection application corresponding to the contact object 401 three, four or more on the connecting application selection screen 420.

The connecting application selected by the first fourth touch 231 may have priority over the connecting application selected by the second fourth touch 232. The controller may store a feature (for example, whether the connecting application has priority) corresponding to the connecting application with priority in the storage. For example, the controller may display the shortcut icon of the connecting application with priority at a particular location (for example, left of the connecting application without priority; this may be changed by setting) distinguished from another connecting application without priority.

In response to a plurality of connecting applications (or shortcut icons corresponding to the applications) being selected by the user, the controller 130 may change the connecting application with priority or the connecting application without priority based on the user's selection. The controller 130 may display the shortcut icon corresponding to the connecting application with priority on the contact information screen 400 preferentially. For example, the controller 130 may display the shortcut icon corresponding to the connecting application with priority such that it is displayed a specific distance left of (or above) the shortcut icon of the connecting application without priority. The controller 130 may display the shortcut icon corresponding to the connecting application with priority on the contact information input screen 410, for example. Furthermore, in response to the shortcut icons of a plurality of connecting applications being selected by the user, the controller 130 may display a number of one of the plurality of connecting applications along with the shortcut icon of the connecting application with priority (for example, 3) on the contact information screen 400 or contact information input screen 410.

At the operation (S2515) of FIG. 26, the shortcut icon of the connecting application selected is displayed on the contact information input screen.

Figure 37:
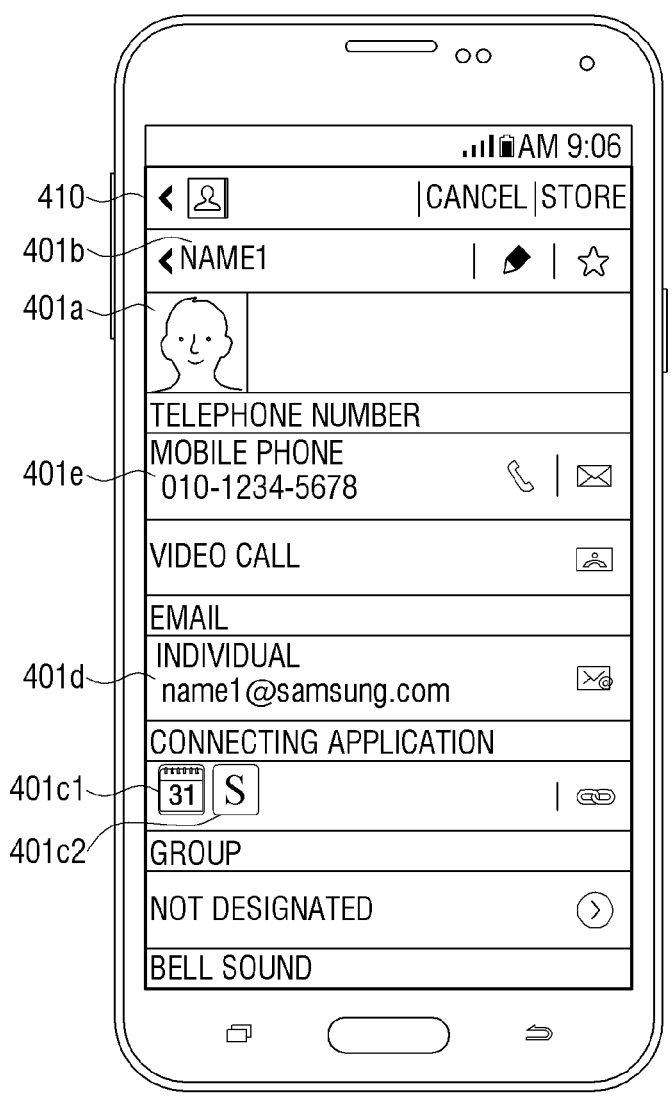

Referring to FIG. 37, the controller 130 displays the shortcut icon of the selected connecting application which corresponds to the fourth touch, on the contact information input screen 410. For example, in response to the shortcut icon of the connecting application being selected by one fourth touch, the controller 130 displays the shortcut icon 401c1 of the one selected connecting application. Furthermore, in response to the shortcut icon being selected by the connecting application based on a plurality of fourth touches, the controller 130 displays the shortcut icons 401c1, 401c2 of the selected plurality of connecting applications. The controller 130 displays the shortcut icon 401c2 of the second selected connecting application adjacent to and on the right side of the shortcut icon 401c1 of the connecting application with priority.

Figure 38:
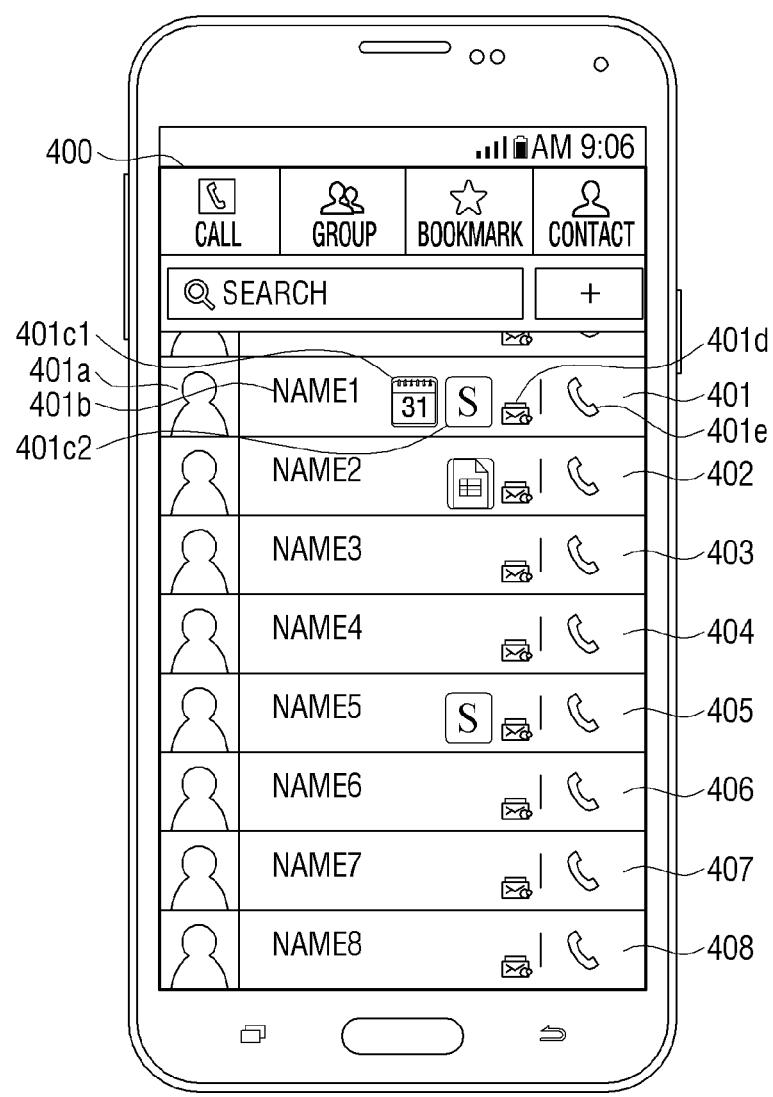

Meanwhile, FIG. 38 is a view illustrating the contact object information related to the plurality of contact information being displayed in a summary format.

The controller 130 may, for example, execute the connecting application with priority which corresponds to the telephone numbers of the contact objects. Detailed explanation on the exemplary execution of the connecting application will be made hereinafter.

At the operation (S2516) of FIG. 26, the contact information input into the contact information input screen is stored.

The controller 130 may store the contact information (for example, contact object information) corresponding to the contact object input by the user in the storage. The controller 130 may store the contact object information in the predetermined area in the storage. The controller 130 may manage the contact object information in a database (DB). The controller 130 may store the contact object information in the storage in a data file. Furthermore, the controller 130 may store the contact object information in a separate file. The contact object information stored in the storage 140 may be content that may be displayed in the connecting application that corresponds to the incoming telephone number and that is being executed.

The contact information including the connecting application corresponding to each contact object may be shown as in table 1 below.

TABLE 1

| Name | Telephone number | Name of connecting application | Path of connecting application | Priority | Email address |
|---|---|---|---|---|---|
| Name 1 | 010-1234-5678 | S planner | com.samsung.app.splanner | 1 | name1@samsaung.com |
| | | S memo | com.samsung.app.note | | |

TABLE 1-continued

| Name | Telephone number | Name of connecting application | Path of connecting application | Priority | Email address |
|---|---|---|---|---|---|
| Name 2 | 010-2345-6789 | excel | com.samsung.app.excel | 0 | name2@samsung.com |
| Name 3 | 010-3456-7890 | — | — | — | name3@samsung.com |
| ... | ... | — | ... | ... | ... |
| Name 11 | 010-1234-6789 | S planner | com.samsung.app.splanner | — | name9@samsaung.com |

The contact information (for example, name, telephone number, name of connecting application, path of connecting application, priority or email address etc.) displayed in the above Table 1 is a portion of the entirety of the contact information corresponding to the contact objects 401 to 409. Furthermore, the contact objects are also only some of the entire number of contact objects.

There may be only one connecting application corresponding to the contact objects (for example, see name 2 or name 11). There may be a plurality of connecting applications corresponding to the contact object (for example, see name 1). Furthermore, there may be no connecting application corresponding to the contact object (for example, see name 3). There may be one or a plurality of telephone numbers corresponding to the contact object. There may be one or a plurality of email addresses corresponding to the contact object.

The items of the contact information corresponding to the contact objects displayed in table 1 above are just an example, and thus the items may be added, edited, or deleted based on the performance and functionality of the terminal apparatus 100.

In the exemplary embodiment of the present disclosure, the execution of the connecting application corresponding to the contact object information and displaying the search result may be implemented not only via the contact information application but also via another application (for example, an application of a 3$^{rd}$ party and not the manufacturer). The controller 130 may execute the connecting application corresponding to the contact object information and display the search result using the contact object information, contact information application and the 3$^{rd}$ party application. The controller 130 may execute the connecting application and display the search result through an interaction (for example, data transmission or receiving) between the contact information application and 3$^{rd}$ party application using the contact object information.

At the operation (S2516) of FIG. 26, in response to the contact information and connecting application being stored, the registering of the contact information and connecting application is completed in the terminal apparatus.

In response to the contact information and connecting application being stored at the operation (S2516) of FIG. 26, the registering of the contact information and connecting application is completed at the operation (S2510) of FIG. 25.

At the operation (S2520) of FIG. 25, the incoming call is received.

Referring to FIG. 28, the incoming call is received in the terminal apparatus 100. The incoming call is received in the terminal apparatus 100 via an exchanger (not illustrated), base station (not illustrated), and mobile communication server (not illustrated). The controller 130 may display the incoming number 401e (for example, caller telephone number) included in the received incoming call on the incoming call screen 500.

The controller 130 displays the call icon 500a and call reject icon 500b on the incoming call screen 500.

At the operation (S2530) of FIG. 25, the incoming call number and the prestored contact object information are compared with each other.

Referring to FIG. 28, the controller 130 compares the contact object information prestored in the storage 140 using the incoming call number. The controller 130 displays the photograph 401a and/or name 401b that are part of the contact object information corresponding to the incoming call number. Furthermore, the controller may further display some (for example, email address and birthday etc.) of the stored contact object information other than the photograph 401a and/or name 401b.

The terminal apparatus 100 supports the caller identification function (CID). A wired/wireless communication service provider provides the caller number display service using the CID function. The caller number display service follows the ITU-T standard. The caller identification information is the unique identifier of the caller, and may include a telephone number (incoming telephone number of caller telephone number), telephone call, telephone call time or incoming call, or incoming call time. When the terminal apparatus 100 does not support the CID function, the controller 130 may not display the incoming call number or contact object information included in the incoming call on the screen. When the incoming call number or contact object information cannot be displayed on the screen, the controller 130 may display the number of incoming calls on the screen.

The terminal apparatus 100 may support the CID function for voice calls and video calls made through not only wired/wireless communication but also data communication. For example, in the case of a separate application wherein an email address or identifier (ID) of the contact object is used, the controller may identify the caller using the email address or identifier of the contact object included in the contact object information. Those skilled in the art would easily understand that the caller may be identified by using not only the email address or identifier of the contact object but also the items included in the contact object information.

At the operation (S2540) of FIG. 25, the application connected to the contact object corresponding to the incoming call number is executed.

The controller 130 may confirm the connecting application (for example, S planner) of the contact object corresponding to the incoming call number using the contact object information stored in the storage 140. Furthermore, the controller may execute the connecting application using the path (for example, com.samsung.app.splanner) of the connecting application of the contact object corresponding to the incoming call number. The connecting application being executed may operate in the background instead of being displayed on the screen.

At the operation (S2550) of FIG. 25, items corresponding to the contact object are searched in the executed connecting application.

The controller 130 searches for the items (for example, name, telephone number, email address, and photograph etc.) corresponding to the prestored contact object information in the connecting application. The prestored contact object information may include a photograph, name, address, email address, contract information group, or birthday etc. The controller may search for the items corresponding to the contact object information by a text search or image search.

At the operation (S2560) of FIG. 25, the search result is displayed in the executed connecting application.

The controller 130 displays the search result regarding the items of the contact object information corresponding to the incoming call number on the screen 550 of the executed connecting application (for example, S planner). The controller 130 may display the connecting application screen 550 (FIG. 29) on a portion of the incoming call screen 500 in an overlapping manner. The controller 130 may display a size area of the connecting application screen 550 being overlapped to be narrower than the incoming call screen 500. Furthermore, the controller 130 may change the incoming call screen 500 to the connecting application screen 550. The changed connecting application screen 550 may be displayed instead of the incoming call screen 500.

The controller 130 displays the search result 551 to 553 of the contact object corresponding to the incoming call number in the displayed connecting application screen 550. The controller 130 may display the search result 551 to 553 corresponding to the items of the contact object information which is associated with the incoming call number in the displayed connecting application screen 550. Furthermore, the controller 130 may display the search result 551 to 553 that are identical to the items of the contact object information associated with the incoming call number in the connecting application screen 550 displayed.

The search result 551 to 553 related to the contact object information may be displayed such that it is differentiated (for example, in various ways such as, displayed with highlights, displayed thickly, displayed with an inclination, or displayed with emphasis on text) in the connecting application screen 550. The connecting application screen 550 may be displayed such that it is enlarged or reduced with respect to the screen size of the terminal apparatus 100. Furthermore, the number of schedules (for example, daily, weekly, monthly or yearly) displayed on the connecting application screen 550 may be changed by the user.

The controller 130 may display the connecting application screen 550 and search result 551 to 553 after the search is completed as shown in FIG. 29. Furthermore, the controller 130 may display the connecting application screen 550, for example, without a highlight or thick display, and then display the search result 551 to 553.

In response to receiving the incoming call that includes other user identification information, the controller 130 may display the other user identification information and the connecting application corresponding to the contact object information corresponding to the other user identification information.

The controller 130 may provide the user with the feedback corresponding to the display of the search result in the connecting application being executed. The feedback being provided may be provided to the user as one of a visual feedback, audio feedback and tactile feedback. The controller 130 may provide the user with one of the visual feedback, audio feedback and tactile feedback or a combination thereof.

The visual feedback may display a visual effect (for example, animation effect of an additional image or fading applied to the additional effect) corresponding to the display of search result such that it is differentiated from the connecting application screen 550 being displayed on the touch screen 190. The audio feedback is a sound corresponding to the display of a search result in the connecting application that may be output from one or both of the first speaker 163a and second speaker 163b. The tactile feedback may be output from the vibration motor 164 such that it corresponds to the display of the search result in the connecting application. At least one feedback may be maintained from the start of the display of the search result to the end of display of the search result in the connecting application. When setting the environment (not illustrated) of the terminal apparatus 100, the feedback (for example, at least one of the visual feedback, audio feedback, and tactile feedback) corresponding to the display of search result may be selected and/or changed in the connecting application. Furthermore, the feedback providing time (for example, 500 msec) where the at least one feedback is provided to the user may be input and/or changed by the user.

In another exemplary embodiment, not only when receiving the incoming call but also during the call with the caller, the controller 100 may display the connecting application and search result. When the call with the caller ends, the controller 100 may not display the connecting application and search result. Furthermore, in an exemplary embodiment of the present disclosure, those skilled in the art would easily understand that this may be applied not only when receiving the incoming call but also during the call to the contact object or during the call with the receiver.

At the operation (S2560) of FIG. 25, when displaying the search result in the connecting application, the method of displaying the content of the terminal apparatus ends.

Figure 30:
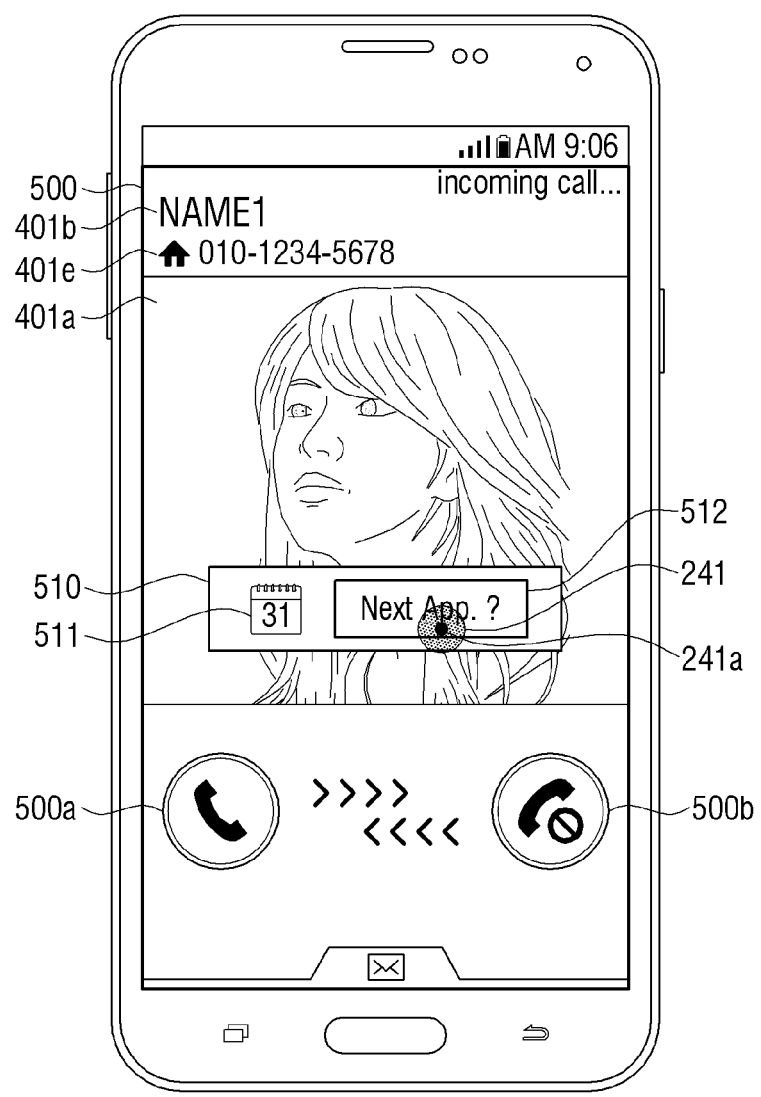
FIGS. 30 and 31 are views illustrating an example of a screen of a terminal apparatus according to another exemplary embodiment.
Figure 31:
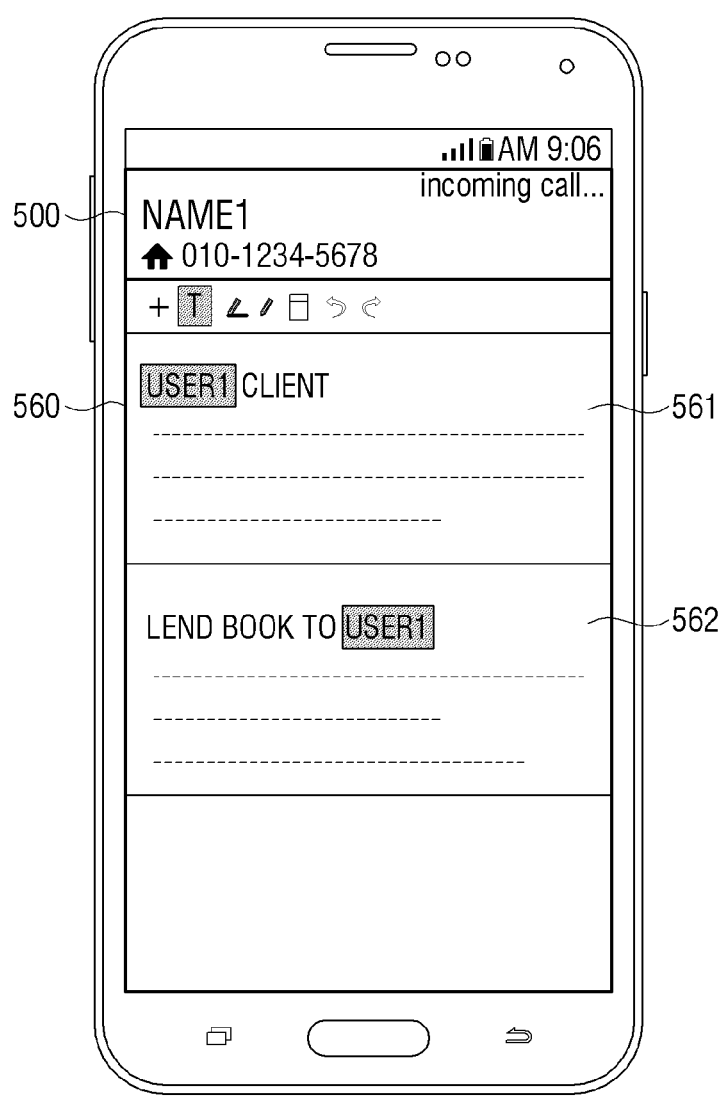

FIGS. 30 and 31 are views illustrating an example of a screen of a terminal apparatus according to another exemplary embodiment of the present disclosure.

The other exemplary embodiment of the present disclosure will be explained assuming that there are a plurality of connecting applications corresponding to the contact object.

Registering of the contact information and connecting application is substantially the same as in the exemplary embodiment of the present disclosure and thus repeated explanation is omitted.

In response to receiving the incoming call from outside, referring to FIG. 30, the incoming call is received in the terminal apparatus 100. The incoming call is received in the terminal apparatus 100 via the exchanger (not illustrated), base station (not illustrated) and mobile communication service provider server (not illustrated). The controller may display the incoming call number 401e (for example, caller telephone number) included in the incoming call received on the incoming call screen 500.

The controller 130 displays the call icon 500a and call reject icon 500b on the incoming call screen 500.

The controller 130 may display the connecting application selecting popup 510. Before the connecting application selecting popup 510 is displayed, the controller 130 may compare the incoming call number with the contact object information prestored in the storage. The controller 130 may confirm the contact object information stored in the storage 140 and the plurality of connecting applications (for example, S planner, S memo) of the contact object corresponding to the incoming call number. In response to there being a plurality of connecting applications of the contact object, the controller 130 may confirm the priority of the connecting application. Furthermore, the controller 130 may configure the shortcut icon corresponding to the connecting applications.

The controller 130 may display the shortcut icon 511 corresponding to the connecting application on the connecting application selection popup 510. Furthermore, the controller 130 may display the shortcut icon 501 corresponding to the connecting application with priority on the left side of the screen. The controller 130 may display the shortcut icon (not illustrated) of the connecting application (for example, S memo) without priority on the right side of the shortcut icon 501 of the connecting application with priority or display as a selection box (for example, Next App.) 512.

In response to the shortcut icon 501 of the connecting application with priority being selected, the controller 130 may display the screen shown in FIG. 29.

Furthermore, in response to there being a plurality of connecting applications corresponding to the caller identification information, the controller may not display the shortcut icon 511 corresponding to the connecting application with priority but may display the connecting application screen 550. The controller 130 may display on the connecting application screen with priority the search result corresponding to the user identification information.

In response to the fifth touch 241 of the user being input in the selection box 512, the controller may detect the fifth touch 241 using the touch screen 190 and touch screen controller 195. The controller 130 may compute the fifth touch location 241*a* (for X5 and Y5 coordinate) corresponding to the fifth touch 241 using the electrical signal being received from the touch screen controller 195.

The detection of the fifth touch 241 is substantially the same as the detection of the first touch 201 at FIG. 32 and thus repeated explanation is omitted.

The controller 130 executes the next connecting application (for example, S memo) without priority based on the fifth touch. The controller 130 may confirm the connecting application without priority of the contact object stored in the controller 130. Furthermore, the controller 130 may execute the connecting application using the connection application route (for example, com.samsung.app.note) without priority. The executed connecting application may operate in the background instead of being displayed on the screen.

The controller 130 searches for an item corresponding to (for example, identical to) the contact object information in the connecting application without priority. The prestored contact object information may include a photograph, name, address, email address, contact information group, or birthday etc. The controller 130 may search the items corresponding to the contact object information using a text search or image search.

The controller 130 displays the search result corresponding to the incoming call number in the connecting application without priority. The controller 130 displays the connecting application screen 560. The controller 130 may display the connecting application screen 560 on a portion of the incoming call screen 500 in an overlapping manner. The size area of the overlapped connecting application screen 560 may be smaller than the incoming call screen 500.

The controller 130 displays the search result 561 and 562 corresponding to the contact object, which corresponds to the incoming call number, in the displayed connecting application screen. The search result 561 and 562 may be displayed such that it is differentiated (for example, in various ways such as a highlighted display, a thick display etc,) in the connecting application screen 560. The connecting application screen 560 may be displayed such that it is enlarged or reduced based on the screen size of the terminal apparatus 100. Furthermore, the number of the memo being displayed on the connecting application screen 560 may be changed by the user.

The controller 130 may display the connecting application screen 560 and search result 561 and 562 after the search is completed, as shown in FIG. 31. Furthermore, the controller 130 may display the connecting application screen 560 first (for example, without a highlighted display or a thick display), and display the search result 561 and 562 later.

In another exemplary embodiment of the present disclosure, not only when receiving the incoming call but also during the call with the caller, the controller 130 may display the connecting application and search result. When the call with the caller ends, the controller 130 may not display the connecting application and search result being displayed. Furthermore, those skilled in the art would easily understand that this may be applied to not only when receiving the incoming call but also during a caller call or receiver call with the contact object.

In response to the search result being displayed in the connecting application, the method for displaying the content of the terminal apparatus ends.

Meanwhile, the method for displaying the content of the terminal apparatus according to another embodiment may further include displaying the curation content based on the contact object information related to the preset event.

Specifically, in response to a preset event based on a user setting occurring, the controller 130 may set the media to share, and designate link information or a URL regarding the media. For example, in response to an event such as a birthday occurring, the controller 130 may execute the set application or automatically display the link information and URL corresponding to the set service based on the registered date and time and designated person or place.

Such a preset event may be an anniversary alarm event or an upcoming preset time event. For example, an anniversary alarm event may be a birthday alarm event or a wedding anniversary alarm event. An upcoming preset time event may be an event which is set like as 07:00 AM and 10:00 PM, occurring when a preset time nears.

Methods according to various exemplary embodiments of the present disclosure may be embodied in the form of a program command and be performed through various computer means and be recorded in a computer readable medium.

For example, there may be provided a non-transitory computer readable medium that stores a program for storing the contact object information that includes the connecting application corresponding to the caller identification information, receiving the incoming call that includes the caller identification information, executing the connecting application corresponding to the caller identification information, and displaying the search result related to the contact object information on the connecting application screen.

The computer readable medium may include a program command, data file, and data structure or a combination thereof. For example, the computer readable medium may be stored in a volatile or nonvolatile storage device such as a ROM, or for example, a memory such as a RAM, memory chip, device or integrated circuit, or for example, in a storage medium that is readable by a machine (for example computer) and that may optically or magnetically record for example a CD, DVD, magnetic disc or magnetic tape, regardless of whether it is possible to delete or rerecord data. The memory that may be included in a mobile terminal is an example of a storage medium that could be read by a program or a machine suitable to store the programs including commands that embody the embodiments of the present disclosure. The program commands recorded in the medium may be those designed and configured specially for the present disclosure or those well known and usable by those skilled in the computer software field. The foregoing embodiments and advantages are merely exemplary and are not to be construed as limiting. The present teaching can be readily applied to other types of apparatuses. Also, the description of the exemplary embodiments is intended to be illustrative, and not to limit the range of the claims, and many alternatives, modifications, and variations will be apparent to those skilled in the art.

What is claimed is:

1. A method for displaying content of a terminal apparatus, the method comprising:
   based on receiving an incoming call that includes caller identification information, identifying contact object information relating to the caller identification information, that is stored in a storage of the terminal apparatus;
   displaying the contact object information on a screen of a connecting application among a plurality of connecting applications while the incoming call is being received;
   setting some of the plurality of connecting applications as connecting applications with a priority and some of the plurality of connection applications as connecting applications without the priority; and
   displaying an icon corresponding to the connecting application with the priority in response to the plurality of connecting applications being related to the caller identification information.

2. The method according to claim 1, wherein the caller identification information includes a telephone number, and
   the displaying the contact object information comprises displaying the caller identification information together with the contact object information.

3. The method according to claim 1, wherein the displaying the contact object information comprises displaying the contact object information such that it is differentiated from other items in the connecting application.

4. The method according to claim 1, wherein the contact object information comprises at least one from among the connecting application corresponding to a contact object and a shortcut icon corresponding to the connecting application.

5. The method according to claim 1, further comprising, based on the incoming call being received, displaying an incoming call screen that includes the caller identification information corresponding to the incoming call.

6. The method according to claim 1, wherein at least one from among a visual feedback, audio feedback, and tactile feedback is provided via the connecting application screen based on a display of the contact object information.

7. The method according to claim 1, further comprising, in response to a preset event occurring, displaying a curation content based on contact object information related to the preset event.

8. A terminal apparatus, comprising:
   a display;
   a transceiver;
   a storage that stores contact object information relating to caller identification information; and
   a processor, based on receiving an incoming call including the caller identification information received through the transceiver, identifies the contact object information relating to the caller identification information, and displays the contact object information on a screen of a connecting application among a plurality of connecting applications while the incoming call is being received,
   wherein the processor, based on there being the plurality of connecting applications related to the caller identification information, sets some of the plurality of the connecting applications with a priority and some of the plurality of connection applications as connecting applications without the priority, and
   wherein the processor displays an icon corresponding to the connecting application with the priority on the display in response to the plurality of connecting applications being related to the caller identification information.

9. The apparatus according to claim 8, wherein the display comprises a touch screen, and
   the processor controls to store the contact object information being input through the touch screen in the storage.

10. The apparatus according to claim 8, wherein the processor displays the caller identification information together with the contact object information.

11. The apparatus according to claim 8, wherein the processor displays the contact object information such that it is differentiated from other items in the connecting application.

12. The apparatus according to claim 8, wherein the contact object information comprises at least one from among the connecting application corresponding to a contact object and a shortcut icon corresponding to the connecting application.

13. The apparatus according to claim 8, wherein the processor, based on the incoming call being received, displays an incoming call screen that includes the caller identification information corresponding to the incoming call.

14. The apparatus according to claim 13, wherein a size area of the connecting application screen where the contact object information is displayed is smaller than a size area of the incoming call screen.

15. The apparatus according to claim 8, wherein the processor changes the incoming call screen to the connecting application screen where the contact object information is displayed.

16. The apparatus according to claim 8, wherein the processor, based on a preset event occurring, displays a curation content based on contact object information related to the preset event.

* * * * *